(12) United States Patent
Xu et al.

(10) Patent No.: US 11,082,150 B2
(45) Date of Patent: Aug. 3, 2021

(54) WIRELESS COMMUNICATION METHOD AND APPARATUS FOR MAPPING A PHASE TRACKING REFERENCE SIGNAL BASED ON A TARGET MODULATION AND CODING SCHEME INDEX

(71) Applicant: Huawei Technologies Co., Ltd., Shenzhen (CN)

(72) Inventors: Minghui Xu, Chengdu (CN); Peng Guan, Chengdu (CN); Xi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/673,544

(22) Filed: Nov. 4, 2019

(65) Prior Publication Data

US 2020/0067628 A1 Feb. 27, 2020

Related U.S. Application Data

(63) Continuation of application No. PCT/CN2018/085520, filed on May 4, 2018.

(30) Foreign Application Priority Data

| May 4, 2017 | (CN) | .......................... 201710309617.5 |
| Jun. 15, 2017 | (CN) | .......................... 201710453333.3 |
| Nov. 10, 2017 | (CN) | .......................... 201711106456.6 |

(51) Int. Cl.
*H04L 12/28* (2006.01)
*H04L 1/00* (2006.01)
(Continued)

(52) U.S. Cl.
CPC ............ *H04L 1/0004* (2013.01); *H04L 5/006* (2013.01); *H04L 5/0007* (2013.01); *H04L 5/0048* (2013.01); *H04W 72/0453* (2013.01)

(58) Field of Classification Search
CPC .... H04L 1/0004; H04L 27/261; H04L 1/0003
(Continued)

(56) References Cited

U.S. PATENT DOCUMENTS

| 7,929,472 B2 | 4/2011 | Gu et al. |
| 9,591,493 B2 | 3/2017 | Gutierrez et al. |

(Continued)

FOREIGN PATENT DOCUMENTS

| CN | 103891166 A | 6/2014 |
| CN | 108282877 A | 7/2018 |

(Continued)

OTHER PUBLICATIONS

"Study on New Radio Access Technology," 3GPP TSG RAN meeting #74, Vienna, Austria, RP-162201, pp. 1-148, 3rd Generation Partnership Project, Valbonne, France (Dec. 5-8, 2016).

(Continued)

*Primary Examiner* — John Pezzlo
(74) *Attorney, Agent, or Firm* — Leydig, Voit & Mayer, Ltd.

(57) ABSTRACT

Embodiments of this application disclose a wireless communication method and an apparatus. The method includes: determining a target MCS if a current MCS exceeds a predetermined threshold, where the target MCS is an MCS less than or equal to the predetermined threshold; mapping a PTRS to one or more symbols based on the target MCS; and sending, to a terminal device, the symbol to which the PTRS is mapped. through implementation of the embodiments of this application, when the current MCS exceeds the predetermined threshold, the target MCS that is less than or equal to the predetermined threshold may be determined, so that a density of a PTRS on a time-frequency resource can be flexibly determined based on the target MCS and an association relationship between an MCS threshold and a time domain density of a PTRS, thereby helping reduce resource overheads of the PTRS.

20 Claims, 6 Drawing Sheets

```
Determine a target MCS if a current MCS exceeds a      ___ 201
predetermined threshold

│
                          ▼

Map a PTRS to one or more symbols or subcarriers based  ___ 202
on the target MCS
```

(51) Int. Cl.
  *H04L 5/00*   (2006.01)
  *H04W 72/04*  (2009.01)
  *H04J 1/16*   (2006.01)

(58) Field of Classification Search
  USPC .......................................... 370/252, 329, 386
  See application file for complete search history.

(56) References Cited

U.S. PATENT DOCUMENTS

| | | | |
|---|---|---|---|
| 10,200,175 B2* | 2/2019 | Park | H04L 5/0051 |
| 2016/0261391 A1* | 9/2016 | Chen | H04L 1/1861 |
| 2017/0026977 A1 | 1/2017 | Gaal et al. | |
| 2019/0379481 A1* | 12/2019 | Zhang | H04L 5/0048 |

FOREIGN PATENT DOCUMENTS

| | | |
|---|---|---|
| CN | 108632009 A | 10/2018 |
| EP | 2938124 A1 | 10/2015 |
| WO | 2016208899 A1 | 12/2016 |

OTHER PUBLICATIONS

"Further details for PT-RS design," 3GPP TSG RAN WG1 Meeting #88b, Spokane, USA, R1-1704240, XP051251049, pp. 1-5, 3rd Generation Partnership Project, Valbonne, France (Apr. 3-7, 2017).
"CQI/ MCS/TBS table design for higher order modulation," 3GPP TSG RAN WG1 #76, Prague, Czech Republic, R1-140593, XP050736119, pp. 1-5, 3rd Generation Partnership Project, Valbonne, France (Feb. 10-14, 2014).

* cited by examiner

WIRELESS COMMUNICATION METHOD AND APPARATUS FOR MAPPING A PHASE TRACKING REFERENCE SIGNAL BASED ON A TARGET MODULATION AND CODING SCHEME INDEX

CROSS-REFERENCE TO RELATED APPLICATIONS

This application is a continuation of International Application No. PCT/CN2018/085520, filed on May 4, 2018, which claims priority of Chinese Patent Application No. 201711106456.6, filed on Nov. 10, 2017, Chinese Patent Application No. 201710453333.3, filed on Jun. 15, 2017 and Chinese Patent Application No 201710309617.5, filed on May 4, 2017. The disclosures of the aforementioned applications are hereby incorporated by reference in their entireties.

TECHNICAL FIELD

Embodiments of this application relate to the field of communications technologies, and in particular, to a wireless communication method and an apparatus.

BACKGROUND

In an existing wireless communications network, there are increasingly fewer available operating frequency bands falling within a frequency range below 6 GHz, and an increasing communication requirement cannot be met. In a next-generation wireless communications network (for example, 5G), an operating frequency band of a communications system is above 6 GHz. Therefore, the next-generation wireless communications network has a notable feature of a high-frequency communications system, and therefore a relatively high throughput is easily implemented. However, compared with the existing wireless communications network, the next-generation wireless communications network that operates within the range above 6 GHz is to suffer from serious intermediate radio frequency distortion, especially impact of phase noise (PHN). The phase noise, a Doppler effect, and a center frequency offset (CFO) introduce a phase error into data reception in the high-frequency communications system, and consequently performance of the high-frequency communications system is degraded or even the high-frequency communications system cannot operate.

Because the phase noise, the Doppler effect, and the center frequency offset introduce the phase error into data reception in the high-frequency communications system, a demodulation reference signal (DMRS) and a phase tracking reference signal (PTRS) (which may also be referred to as a phase compensation reference signal (PCRS)) are provided in the prior art to jointly complete channel estimation, phase noise estimation, and data demodulation. The DMRS is used for channel estimation and data demodulation, and the PTRS is used for tracking a residual phase error.

In the prior art, a time domain density and a frequency domain density of the PTRS are fixed values. In high data bandwidth, if the time domain density and the frequency domain density of the PTRS are fixed values, a relatively large quantity of subcarriers are occupied, and resource overheads are relatively high. Therefore, how to flexibly configure the PTRS and reduce the resource overheads of the PTRS is an urgent problem to be resolved.

SUMMARY

Embodiments of this application provide a wireless communication method and an apparatus, to flexibly configure a PTRS and reduce resource overheads of the PTRS.

According to a first aspect, an embodiment of this application provides a wireless communication method, and the method includes: determining a target modulation and coding scheme MCS if a current MCS exceeds a predetermined threshold, where the target MCS is an MCS less than or equal to the predetermined threshold; and mapping a phase tracking reference signal PTRS to one or more symbols or subcarriers based on the target MCS.

It can be learned that through implementation of the communication method described in the first aspect, when the current MCS exceeds the predetermined threshold, the target MCS that is less than or equal to the predetermined threshold may be determined, so that a density of a PTRS on a time-frequency resource may be flexibly determined based on the target MCS and an association relationship between an MCS threshold and a time domain density of a PTRS, thereby helping reduce resource overheads of the PTRS.

Optionally, a specific implementation of determining a target MCS may include: determining a target modulation order based on the current MCS; and determining an MCS corresponding to the target modulation order as the target MCS based on information about a correspondence between a modulation order and an MCS. Through implementation of this implementation, the target MCS that is less than or equal to the predetermined threshold can be determined. Therefore, a time domain density and a frequency domain density of a PTRS are flexibly configured, and PTRS overheads are reduced.

Optionally, a specific implementation of the determining an MCS corresponding to the target modulation order as the target MCS based on information about a correspondence between a modulation order and an MCS may include: when the target modulation order corresponds to a plurality of MCSs, determining a largest MCS in the plurality of MCSs corresponding to the target modulation order as the target MCS. If the target MCS is larger, the determined time domain density and frequency domain density of the PTRS is larger, and therefore system performance can be ensured. It can be learned that through implementation of this implementation, the target MCS that is less than or equal to the predetermined threshold can be determined. Therefore, a time domain density and a frequency domain density of a PTRS are flexibly configured, and system performance is ensured when PTRS overheads are reduced.

Optionally, a specific implementation of the determining an MCS corresponding to the target modulation order as the target MCS based on information about a correspondence between a modulation order and an MCS may include: when the target modulation order corresponds to a plurality of MCSs, determining a smallest MCS in the plurality of MCSs corresponding to the target modulation order as the target MCS. Through implementation of this implementation, the target MCS that is less than or equal to the predetermined threshold can be determined. Therefore, a time domain density and a frequency domain density of a PTRS are flexibly configured, and PTRS overheads are reduced.

Optionally, if the target modulation order corresponds to a plurality of MCSs, the target MCS may be any one of the plurality of MCSs that correspond to the target modulation order and that are less than the predetermined threshold except a largest MCS and a smallest MCS. Through implementation of this implementation, the target MCS that is less than or equal to the predetermined threshold can be determined. Therefore, a time domain density and a frequency domain density of a PTRS are flexibly configured, and PTRS overheads are reduced.

Optionally, a specific implementation of determining a target MCS may include: using, as the target MCS, an MCS used in initial transmission or an MCS used in last transmission. The MCS used in initial transmission represents an MCS used when data is initially transmitted, and the MCS used in last transmission represents an MCS used when data is transmitted last time, where "last transmission" may be initial transmission or may be retransmission. Through implementation of this implementation, the target MCS that is less than or equal to the predetermined threshold can be determined. Therefore, a time domain density and a frequency domain density of a PTRS are flexibly configured, and PTRS overheads are reduced.

Optionally, a specific implementation of determining a target MCS may include: using the predetermined threshold as the target MCS. If the target MCS is larger, the determined time domain density and frequency domain density of the PTRS is larger, and therefore system performance can be ensured. Therefore, through implementation of this implementation, the target MCS that is less than or equal to the predetermined threshold can be determined. Therefore, a time domain density and a frequency domain density of a PTRS are flexibly configured, and system performance is ensured when PTRS overheads are reduced.

Optionally, a specific implementation of determining a target MCS may include: determining the target MCS based on a quantity of bits that currently need to be transmitted and scheduling bandwidth. Through implementation of this implementation, the target MCS that is less than or equal to the predetermined threshold can be determined. Therefore, a time domain density and a frequency domain density of a PTRS are flexibly configured, and PTRS overheads are reduced.

In this implementation, specifically, the quantity of bits that currently need to be transmitted is used as a transport block size currently need to be transmitted, and a target transport block set index corresponding to both the transport block size currently need to be transmitted and the current scheduling bandwidth is determined based on a mapping relationship between a transport block set index, and a transport block size and scheduling bandwidth; and an MCS corresponding to the target transport block set index is determined as the target MCS based on a mapping relationship between an MCS and a transport block set index.

Optionally, if it is determined, based on the mapping relationship between an MCS and a transport block set index, that a plurality of MCSs correspond to the target transport block set index, the target modulation order corresponding to the current MCS may be determined, and an MCS that corresponds to the target modulation order and that is in the plurality of MCSs corresponding to the target transport block set index is used as the target MCS.

Optionally, the determining a target MCS specifically includes: determining an MCS that is configured by using a physical downlink control channel and that is less than or equal to the predetermined threshold as the target MCS. Through implementation of this implementation, the target MCS that is less than or equal to the predetermined threshold can be determined. Therefore, a time domain density and a frequency domain density of a PTRS are flexibly configured, and PTRS overheads are reduced.

Optionally, the MCS configured by the physical downlink control channel may be an MCS configured by a semi-static physical downlink control channel in a latest time.

According to a second aspect, an apparatus is provided, and the apparatus may perform the method in the first aspect or the possible implementations of the first aspect. The function may be implemented by hardware, or may be implemented by hardware by executing corresponding software. The hardware or the software includes one or more units corresponding to the foregoing function. The unit may be software and/or hardware. Based on a same inventive concept, for problem-resolving principles of the apparatus and beneficial effects, refer to the first aspect or the possible implementations of the first aspect and the beneficial effects. Details are not described again.

Optionally, the apparatus may be a network device or a terminal device.

According to a third aspect, an apparatus is provided. The apparatus includes a processor, a memory, a communications interface, and one or more programs, where the processor, the communications interface, and the memory are connected, the one or more programs are stored in the memory, and the one or more programs may be run by the processor, to perform the solution in the first aspect or the possible implementations of the first aspect. For problem-resolving implementations of the apparatus and beneficial effects, refer to the first aspect or the possible implementations of the first aspect and the beneficial effects. Details are not described again.

According to a fourth aspect, a computer storage medium is provided. The computer storage medium stores program code, and the program code can be used to indicate performing of the method in the first aspect or any optional implementation of the first aspect.

According to a fifth aspect, an embodiment of the present invention further provides a wireless communication method, where the method includes:

determining a target modulation and coding scheme MCS if a transport block TBS index corresponding to a current MCS is reserved reserved, or if a code rate corresponding to a current modulation and coding scheme MCS is reserved reserved, where an index value of the target MCS is less than an index value of the current MCS; and mapping a phase tracking reference signal PTRS to one or more symbols or a plurality of subcarriers based on the target MCS.

When the transport block TBS index or the code rate corresponding to the current MCS is reserved reserved, the index value of the current MCS may be large, but a modulation order may not be large, for example, may be 2. In this case, a target MCS that is less than the current MCS may be determined, and a density of a PTRS on a time-frequency resource may be flexibly determined based on the target MCS and an association relationship between an MCS threshold and a time domain density of a PTRS, thereby helping reduce resource overheads of the PTRS.

According to a sixth aspect, an embodiment of the present invention further provides a wireless communication method, where the method includes:

if current data is retransmitted, determining a target modulation and coding scheme MCS based on an MCS used in the retransmitted data, where an index value of the target MCS is less than an index value of the MCS used in the current data; and mapping a phase tracking reference signal PTRS to one or more symbols or a plurality of subcarriers based on the target MCS.

If the current data is retransmitted, generally, a value of the modulation and coding scheme MCS used in retransmission may be greater than that used in initial transmission, but a modulation order may not be large, for example, may be 2 or 4. In this case, a target MCS whose index value is less than an index value of the current MCS may be determined, and a density of a PTRS on a time-frequency resource may be flexibly determined based on the target MCS and an association relationship between an MCS threshold and a time domain density of a PTRS, thereby helping reduce resource overheads of the PTRS.

According to a seventh aspect, an embodiment of the present invention further provides a wireless communication method, where the method includes:

preconfiguring or pre-storing information about a correspondence between a plurality of modulation and coding schemes MCSs and a modulation order, where one modulation order corresponds to a plurality of different MCSs;

determining a target MCS if an index value of a currently used MCS is a largest index value in index values of a plurality of MCSs corresponding to a modulation order corresponding to the currently used MCS; and mapping a phase tracking reference signal PTRS to one or more symbols or a plurality of subcarriers based on the target MCS.

When the index value of the currently used MCS is the largest index value in the index values of the plurality of MCSs corresponding to the modulation order corresponding to the currently used MCS, a corresponding modulation order may not be large, for example, may be 2 or 4. In this case, a target MCS that is less than the current MCS may be determined, and a density of a PTRS on a time-frequency resource may be flexibly determined based on the target MCS and an association relationship between an MCS threshold and a time domain density of a PTRS, thereby helping reduce resource overheads of the PTRS.

With reference to any one of the fifth aspect to the seventh aspect, in a possible design, a specific implementation of determining a target MCS may include: determining a target modulation order based on the current MCS; and determining an MCS corresponding to the target modulation order as the target MCS based on information about a correspondence between a modulation order and an MCS. Through implementation of this implementation, the target MCS that is less than or equal to the predetermined threshold can be determined. Therefore, a time domain density and a frequency domain density of a PTRS are flexibly configured, and PTRS overheads are reduced.

With reference to any one of the fifth aspect to the seventh aspect, in a possible design, a specific implementation of the determining an MCS corresponding to the target modulation order as the target MCS based on information about a correspondence between a modulation order and an MCS may include: when the target modulation order corresponds to a plurality of MCSs, determining an MCS with a largest index value in the plurality of MCSs corresponding to the target modulation order as the target MCS. If the target MCS is larger, the determined time domain density and frequency domain density of the PTRS is larger, and therefore system performance can be ensured. It can be learned that through implementation of this implementation, the target MCS that is less than or equal to the predetermined threshold can be determined. Therefore, a time domain density and a frequency domain density of a PTRS are flexibly configured, and system performance is ensured when PTRS overheads are reduced.

With reference to any one of the fifth aspect to the seventh aspect, in a possible design, a specific implementation of the determining an MCS corresponding to the target modulation order as the target MCS based on information about a correspondence between a modulation order and an MCS may include: when the target modulation order corresponds to a plurality of MCSs, determining an MCS with a smallest index value in the plurality of MCSs corresponding to the target modulation order as the target MCS. Through implementation of this implementation, the target MCS that is less than or equal to the predetermined threshold can be determined. Therefore, a time domain density and a frequency domain density of a PTRS are flexibly configured, and PTRS overheads are reduced.

With reference to any one of the fifth aspect to the seventh aspect, in a possible design, if the target modulation order corresponds to a plurality of MCSs, the target MCS may be any one of the plurality of MCSs that correspond to the target modulation order and that are less than the predetermined threshold except an MCS with a largest index value and an MCS with a smallest index value. Through implementation of this implementation, the target MCS that is less than or equal to the predetermined threshold can be determined. Therefore, a time domain density and a frequency domain density of a PTRS are flexibly configured, and PTRS overheads are reduced.

With reference to any one of the fifth aspect to the seventh aspect, in a possible design, a specific implementation of determining a target MCS may include: using, as the target MCS, an MCS used in initial transmission or an MCS used in last transmission. The MCS used in initial transmission represents an MCS used when data is initially transmitted, and the MCS used in last transmission represents an MCS used when data is transmitted last time, where "last transmission" may be initial transmission or may be retransmission. Through implementation of this implementation, the target MCS that is less than or equal to the predetermined threshold can be determined. Therefore, a time domain density and a frequency domain density of a PTRS are flexibly configured, and PTRS overheads are reduced.

With reference to any one of the fifth aspect to the seventh aspect, in a possible design, a specific implementation of determining a target MCS may include: determining the target MCS based on a quantity of bits that currently need to be transmitted and scheduling bandwidth. Through implementation of this implementation, the target MCS that is less than or equal to the predetermined threshold can be determined. Therefore, a time domain density and a frequency domain density of a PTRS are flexibly configured, and PTRS overheads are reduced. In this implementation, specifically, the quantity of bits that currently need to be transmitted is used as a transport block size currently need to be transmitted, and a target transport block set index corresponding to both the transport block size currently need to be transmitted and the current scheduling bandwidth is determined based on a mapping relationship between a transport block set index, and a transport block size and scheduling bandwidth; and an MCS corresponding to the target transport block set index is determined as the target MCS based on a mapping relationship between an MCS and a transport block set index.

If it is determined, based on the mapping relationship between an MCS and a transport block set index, that a plurality of MCSs correspond to the target transport block set index, the target modulation order corresponding to the current MCS may be determined, and an MCS that corresponds to the target modulation order and that is in the plurality of MCSs corresponding to the target transport block set index is used as the target MCS.

With reference to any one of the fifth aspect to the seventh aspect, in a possible design, the determining a target MCS specifically includes: determining an MCS that is configured by using a physical downlink control channel and whose index value is less than or equal to the predetermined threshold as the target MCS. Through implementation of this implementation, the target MCS that is less than or equal to the predetermined threshold can be determined. Therefore, a time domain density and a frequency domain density of a PTRS are flexibly configured, and PTRS overheads are reduced.

The MCS configured by the physical downlink control channel may be an MCS configured by a semi-static physical downlink control channel in a latest time.

According to an eighth aspect, an apparatus is provided. The apparatus may perform the method in the first aspect or the possible implementations of the first aspect, the method in the fifth aspect or the possible implementations of the fifth aspect, the method in the sixth aspect or the possible implementations of the sixth aspect, or the method in the seventh aspect or the possible implementations of the seventh aspect. The function may be implemented by hardware, or may be implemented by hardware by executing corresponding software. The hardware or the software includes one or more units corresponding to the foregoing function. The unit may be software and/or hardware. Based on a same inventive concept, for problem-resolving principles of the apparatus and beneficial effects, refer to the first aspect or the possible implementations of the first aspect and the beneficial effects. Details are not described again.

According to a ninth aspect, an embodiment of the present invention further provides a wireless communication method, where the method includes:

determining a target modulation and coding scheme MCS if an MCS used for the data exceeds a predetermined threshold; and obtaining a phase tracking reference signal PTRS based on the target MCS.

In a possible design, the method further includes:

receiving one or more OFDM symbols, where the one or more OFDM symbols include the phase tracking reference signal PTRS.

According to a tenth aspect, an embodiment of the present invention further provides a wireless communication method, where the method includes:

determining a target modulation and coding scheme MCS if a transport block index TBS index corresponding to an MCS used for data or a code rate is reserved reserved, where the target MCS is less than the current MCS; and obtaining a phase tracking reference signal PTRS based on the target MCS.

Usually, when the transport block index TBS index corresponding to the modulation and coding scheme MCS used for the data or the code rate is reserved reserved, a value of the MCS is relatively large. If a transmit end directly maps a PTRS based on the current MCS, a density of the PTRS is relatively large, and overheads are relatively large. According to the foregoing solution, the transmit end can determine the target MCS that is less than the current MCS, and this helps reduce overheads of a downlink/uplink signal.

In a possible design, the method further includes:

receiving one or more OFDM symbols from a peer end device, where the one or more OFDM symbols include the phase tracking reference signal PTRS.

According to an eleventh aspect, an embodiment of the present invention further provides a wireless communication method, where the method includes:

if current data is retransmitted, determining a target modulation and coding scheme MCS based on an MCS used in the retransmitted data, where the target MCS is less than the MCS used in the current data; and obtaining a phase tracking reference signal PTRS from the one or more OFDM symbols based on the target MCS.

Usually, when the data is retransmitted, a value of the MCS is relatively large. If a transmit end directly maps a PTRS based on the current MCS, a density of the PTRS is relatively large, and overheads are relatively large. According to the foregoing solution, the transmit end can determine the target MCS that is less than the current MCS, and this helps reduce overheads of a downlink/uplink signal.

In a possible design, the method further includes:

receiving one or more OFDM symbols from a peer end device, where the one or more OFDM symbols include the phase tracking reference signal PTRS.

According to a twelfth aspect, an embodiment of the present invention further provides a wireless communication method, where the method includes:

determining a target modulation and coding scheme MCS if an index value of an MCS used for data is a largest index value in index values of a plurality of MCSs corresponding to a modulation order corresponding to the MCS; and obtaining a phase tracking reference signal PTRS based on the target MCS.

Usually, if the index value of the modulation and coding scheme MCS used for the data included in the one or more symbols is the largest index value in the index values of the plurality of MCSs corresponding to the modulation order corresponding to the MCS, if a transmit end directly maps a PTRS based on the current MCS, a density of the PTRS is relatively large, and overheads are relatively large. According to the foregoing solution, the transmit end can determine the target MCS that is less than the current MCS, and this helps reduce overheads of a downlink/uplink signal.

In a possible design, the method further includes:

receiving one or more OFDM symbols from a peer end device, where the one or more OFDM symbols include the phase tracking reference signal PTRS.

With reference to any one of the ninth aspect to the twelfth aspect, in a possible design, information about a correspondence between an MCS and a modulation order is preconfigured or pre-stored.

With reference to any one of the ninth aspect to the twelfth aspect, in a possible design, information that is from the peer end device and that is used to indicate the MCS used in the current data is received.

With reference to any one of the ninth aspect to the twelfth aspect, in a possible design, a specific implementation of determining a target MCS may include: determining a target modulation order based on the current MCS; and determining an MCS corresponding to the target modulation order as the target MCS based on information about a correspondence between a modulation order and an MCS.

With reference to any one of the ninth aspect to the twelfth aspect, in a possible design, a specific implementation of the determining an MCS corresponding to the target modulation order as the target MCS based on information about a correspondence between a modulation order and an MCS may include: when the target modulation order corresponds to a plurality of MCSs, determining a largest MCS in the plurality of MCSs corresponding to the target modulation order as the target MCS.

With reference to any one of the ninth aspect to the twelfth aspect, in a possible design, a specific implementation of the determining an MCS corresponding to the target modulation order as the target MCS based on information about a correspondence between a modulation order and an MCS may include: when the target modulation order corresponds to a plurality of MCSs, determining a smallest MCS in the plurality of MCSs corresponding to the target modulation order as the target MCS.

With reference to any one of the ninth aspect to the twelfth aspect, in a possible design, if the target modulation order corresponds to a plurality of MCSs, the target MCS may be any one of the plurality of MCSs that correspond to the target modulation order and that are less than the predetermined threshold except a largest MCS and a smallest MCS.

With reference to the ninth aspect, in a possible design, a specific implementation of determining a target MCS may include: using, as the target MCS, an MCS used in initial transmission or an MCS used in last transmission, or using, as the target MCS, an MCS used when data is initially transmitted.

With reference to any one of the ninth aspect to the twelfth aspect, in a possible design, the determining a target MCS specifically includes: determining, as the target MCS, an MCS that is configured by using a physical downlink control channel and that is less than the MCS used in the current data. The MCS configured by the physical downlink control channel may be an MCS configured by a semi-static physical downlink control channel in a latest time.

According to a thirteenth aspect, an apparatus is provided. The apparatus may perform the method in any one of the ninth aspect to the twelfth aspect, or the possible implementations of any one of the ninth aspect to the twelfth aspect. The function may be implemented by hardware, or may be implemented by hardware by executing corresponding software. The hardware or the software includes one or more units corresponding to the foregoing function. The unit may be software and/or hardware. Based on a same inventive concept, for problem-resolving principles of the apparatus and beneficial effects, refer to the first aspect or the possible implementations of the first aspect and the beneficial effects. Details are not described again.

According to a fourteenth aspect, a wireless communication method is provided, including:

if a code rate corresponding to a current modulation and coding scheme MCS is reserved reserved, determining a time domain density of a PTRS based on a pre-stored or predefined mapping relationship table between an MCS and a time domain density; or determining a time domain density of the PTRS based on a mapping relationship table between a time domain density and a modulation order or a modulation mode corresponding to a code rate of reserved; and mapping a phase tracking reference signal PTRS to one or more symbols based on the determined time domain density.

In a possible implementation, a value of the MCS is 29, 30, or 31.

In another possible implementation, a value of the MCS is 28, 29, 30, or 31.

In another possible implementation, a value of the MCS is 27, 28, 29, 30, or 31.

According to a fifteenth aspect, a wireless communication method is provided, including:

receiving one or more symbols or a plurality of subcarriers, where a PTRS is mapped to the one or more symbols or the plurality of subcarriers, and a time domain density of the PTRS is related to a modulation and coding scheme MCS;

if a code rate corresponding to a current modulation and coding scheme MCS is reserved reserved, determining a time domain density of the PTRS based on a pre-stored or predefined mapping relationship table between an MCS and a time domain density; or determining a time domain density of the PTRS based on a mapping relationship table between a time domain density and a modulation order or a modulation mode corresponding to a code rate of reserved; and obtaining the PTRS from the one or more symbols or the plurality of subcarriers based on the time domain density of the PTRS.

According to a sixteenth aspect, an apparatus is provided, including a processing module and a communications module, where the processing module is configured to: if a code rate corresponding to a current modulation and coding scheme MCS is reserved reserved, determine a time domain density of the PTRS based on a pre-stored or predefined mapping relationship table between an MCS and a time domain density; or determine a time domain density of the PTRS based on a mapping relationship table between a time domain density and a modulation order or a modulation mode corresponding to a code rate of reserved; and the processing module is further configured to map a phase tracking reference signal PTRS to one or more symbols based on the determined time domain density.

According to a seventeenth aspect, an apparatus is further provided, including a transceiver module and a processing module, where the transceiver module is configured to receive one or more symbols or a plurality of subcarriers, where a PTRS is mapped to the one or more symbols or the plurality of subcarriers, and a time domain density of the PTRS is related to a modulation and coding scheme MCS; and the processing module is configured to: if a code rate corresponding to a current modulation and coding scheme MCS is reserved reserved, determine a time domain density of the PTRS based on a pre-stored or predefined mapping relationship table between an MCS and a time domain density; or determine a time domain density of the PTRS based on a mapping relationship table between a time domain density and a modulation order or a modulation mode corresponding to a code rate of reserved; and obtain the PTRS from the one or more symbols or the plurality of subcarriers based on the time domain density of the PTRS.

According to another aspect of this application, a computer-readable storage medium is provided. The computer-readable storage medium stores an instruction. When the instruction runs on a computer, the computer performs the wireless communication method according to the foregoing aspects.

According to another aspect of this application, a computer program product including an instruction is provided. When the instruction runs on a computer, the computer performs the method according to the foregoing aspects.

With reference to all aspects of this application, according to the technical solution provided in this application, a target MCS that is less than or equal to a predetermined threshold can be determined, so that a time domain density and a frequency domain density of a PTRS are flexibly configured, and overheads of a downlink/uplink signal are reduced when a PTRS is mapped.

DESCRIPTION OF EMBODIMENTS

The following further describes specific embodiments of this application in detail with reference to the accompanying drawings.

The embodiments of this application provide a wireless communication method and an apparatus, to flexibly configure a PTRS and reduce resource overheads of the PTRS.

For better understanding of the embodiments of this application, the following describes a communications system applicable to the embodiments of this application.

Figure 1:
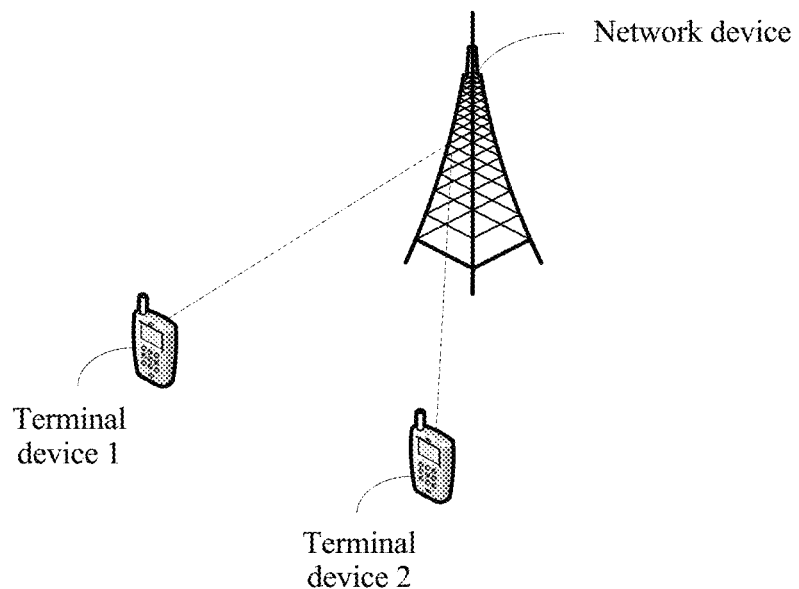
FIG. 1 is a schematic diagram of a communications system according to an embodiment of this application.

FIG. 1 is a schematic diagram of a communications system according to an embodiment of this application. As shown in FIG. 1, the communications system includes a network device and one or more terminal devices, and the network device may communicate with the terminal device. One network device and two terminal devices are used as an example in FIG. 1. It may be understood that the network device may communicate with any quantity of terminal devices.

In addition, the communications system may be a public land mobile network (PLMN) network, a D2D (Device to Device) network, an M2M (Machine to Machine) network, or another network. FIG. 1 is merely a simplified schematic diagram as an example. The network may further include another network device, which is not shown in FIG. 1.

Optionally, in this application, the network device may be a device that communicates with the terminal device, for example, a network device or a network device controller. Each network device may provide communication coverage for a specific geographic area, and may communicate with a terminal device (such as UE) located in the coverage area (a cell). The network device may support communication protocols of different standards, or may support different communication modes. For example, the network device may be a network device (Base Transceiver Station, BTS) in a GSM system or a CDMA system, or may be a network device (NodeB, NB) in a WCDMA system, or may be an evolved network device (Evolved NodeB, eNB, or eNodeB) in an LTE system, or may be a radio controller in a cloud radio access network (CRAN). Alternatively, the network device may be a network device in a future 5G network, for example, a gNB, a small cell, a micro cell, or a TRP (transmission reception point), or may be a relay station, an access point, or a network device in a future evolved public land mobile network (PLMN), or the like.

Optionally, in this application, the terminal device may be an access terminal, user equipment (UE), a subscriber unit, a subscriber station, a mobile station, a mobile console, a remote station, a remote terminal, a mobile terminal, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device that has a wireless communication function, a computing device, another processing device connected to a wireless modem, an in-vehicle device, a wearable device, a terminal device in the Internet of Things, a virtual reality device, a terminal device in a future 5G network, a terminal device in a future evolved public land mobile network (PLMN), or the like.

The network device and the terminal device may be deployed on land, including indoors or outdoors, or in a handheld manner or an in-vehicle manner, or may be deployed on the water, or may be deployed on an airplane, a balloon, or a satellite in the air. Application scenarios of the network device and the terminal device are not limited in this embodiment of this application.

In the prior art, because phase noise, a Doppler effect, and a center frequency offset introduce a phase error into data reception in a high-frequency communications system, a PTRS is provided in the prior art to track a residual phase error. However, an existing network device or terminal device sets a time domain density and a frequency domain density of the PTRS to fixed values (for example, the time domain density is set to 1, and a single-port frequency domain density is set to 1/48). In high data bandwidth, if the time domain density and the frequency domain density of the PTRS are fixed values, a relatively large quantity of subcarriers are occupied, and resource overheads are relatively high.

An existing modulation and coding scheme (MCS) or an index value of an MCS occupies a total of five bits (an index value of an MCS is referred to as an MCS for short below), and ranges from 0 to 31. Modulation orders corresponding to MCSs 0 to n and MCSs n to 31 respectively increase as modulation and coding schemes in corresponding intervals increase, where n is an integer greater than 0 and less than 31. There is no monotonically increasing relationship between modulation orders corresponding to the interval from 0 to 31. In other words, a high modulation and coding scheme may correspond to a low modulation order. That 64 quadrature amplitude modulation (QAM) is used in downlink is used as an example. For example, as shown in Table 1, modulation orders corresponding to MCSs 0 to 28 increase as modulation and coding schemes in a corresponding interval increase, and modulation orders corresponding to MCSs 29 to 31 increase as modulation and coding schemes in a corresponding interval increase, but modulation orders corresponding to MCSs 29 and 30 are less than a modulation order corresponding to an MCS 28. Therefore, modulation orders corresponding to the interval from 0 to 31 do not always progressively increase.

TABLE 1

| MCS | Modulation order 1 | Modulation order 2 | Transport block set index |
|---|---|---|---|
| 0 | 2 | 2 | 0 |
| 1 | 2 | 2 | 1 |

TABLE 1-continued

| MCS | Modulation order 1 | Modulation order 2 | Transport block set index |
|---|---|---|---|
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | Reserved (reserved) |
| 30 | 4 | 4 | |
| 31 | 6 | 6 | |

TABLE 2

| MCS index $I_{MCS}$ | Modulation order $Q_m$ | Modulation order $Q_m'$ | Transport block set index $I_{TBS}$ |
|---|---|---|---|
| 0 | 2 | 2 | 0 |
| 1 | 2 | 2 | 2 |
| 2 | 2 | 2 | 4 |
| 3 | 2 | 4 | 6 |
| 4 | 2 | 4 | 8 |
| 5 | 4 | 6 | 10 |
| 6 | 4 | 6 | 11 |
| 7 | 4 | 6 | 12 |
| 8 | 4 | 6 | 13 |
| 9 | 4 | 6 | 14 |
| 10 | 4 | 8 | 15 |
| 11 | 6 | 8 | 16 |
| 12 | 6 | 8 | 17 |
| 13 | 6 | 8 | 18 |
| 14 | 6 | 8 | 19 |
| 15 | 6 | 8 | 20 |
| 16 | 6 | 8 | 21 |
| 17 | 6 | 8 | 22 |
| 18 | 6 | 8 | 23 |
| 19 | 6 | 8 | 24 |
| 20 | 8 | 8 | 25 |
| 21 | 8 | 8 | 27 |
| 22 | 8 | 8 | 28 |
| 23 | 8 | 8 | 29 |
| 24 | 8 | 8 | 30 |
| 25 | 8 | 8 | 31 |
| 26 | 8 | 8 | 32 |
| 27 | 8 | 8 | 33/33A |
| 28 | 2 | 2 | Reserved |
| 29 | 4 | 4 | |
| 30 | 6 | 6 | |
| 31 | 8 | 8 | |

That 256 QAM modulation is used in downlink is used as an example. There is a correspondence between an MCS index and each of a modulation order $Q_m$ and a modulation order $Q_m'$. As shown in Table 2, there is a correspondence between each MCS index $I_{MCS}$ and each of a modulation order $Q_m$, a modulation order $Q_m'$, and a transport block set index $I_{TBS}$. In some implementations, a used modulation order may be determined based on the modulation order $Q_m$. In some other implementations, for example, when currently transmitted data occupies the second slot of each frame, a used modulation order may be determined based on the modulation order $Q_m'$. In this application, a modulation order below may be either the modulation order $Q_m$ or the modulation order $Q_m'$. This is not limited in this application. It should be understood that a form of Table 2 is merely a possible implementation, and in another implementation, implementation may not be performed in the form of Table 2. For example, there is a correspondence between an MCS index and at least one of a modulation order $Q_m$, a modulation order $Q_m'$, and a transport block set index $I_{TBS}$, and the correspondence may be represented in a form of one or more tables.

Table 2 is used as an example. A same modulation order $Q_m$ or a same modulation order $Q_m'$ corresponds to one or more MCS indexes. For example, if the modulation order $Q_m$ is 2, the modulation order may correspond to MCS indexes 0 to 4 and 28; and if the modulation order $Q_m$ is 4, the modulation order may correspond to MCS indexes 5 to 10 and 29. Therefore, modulation orders corresponding to MCS indexes 0 to 31 do not always progressively increase. Modulation orders corresponding to an MCS index interval from 0 to 27 increase, but modulation orders corresponding to a modulation and coding scheme MCS index interval from 28 to 31 are less than or equal to a modulation order corresponding to an MCS index 27, and modulation orders corresponding to the MSC index interval from 28 to 31 progressively increase.

It should be understood that the data presented in Table 2 is only an example, and there may be one or more MCS index values corresponding to the reserved field. For example, MCS indexes corresponding to reserved in Table 2 are 29 to 31, or may be other values. This is not limited in this application.

That 256 QAM modulation is used in downlink, and an MCS occupies six bits but does not occupy all the six bits is used as an example for description. The six bits may represent a total of 64 MCS index values. "Not occupy all the six bits" means that not all the 64 values are used to represent the MCS, and some values are idle. For example, in Table 3, a value range of the MCS is 0 to 50, and only 51 values are occupied. As shown in Table 3, there is a correspondence between each MCS index $I_{MCS}$ and each of a modulation order $Q_m$, a modulation order $Q_m'$, and a transport block set index $I_{TBS}$. It may be understood that a form of Table 3 is merely a possible implementation, and in another implementation, implementation may not be performed in the form of Table 3. For example, there is a correspondence between an MCS index $I_{MCS}$ and at least one of a modulation order $Q_m$, a modulation order $Q_m'$, and a transport block set index $I_{TBS}$, and the correspondence may be represented in a form of one or more tables.

Table 3 is used as an example. A same modulation order $Q_m$ or a same modulation order $Q_m'$ corresponds to one or more MCS indexes. For example, if the modulation order $Q_m$ is 2, the modulation order may correspond to MCS indexes 0 to 10 and 47; and if the modulation order $Q_m$ is 4, the modulation order may correspond to MCS indexes 11 to 20 and 48. Therefore, modulation orders corresponding to MCS indexes 0 to 50 do not always progressively increase. Modulation orders corresponding to an MCS index interval from 0 to 46 increase, but modulation orders corresponding to an MCS index interval from 47 to 50 are less than or equal to a modulation order corresponding to an MCS index 46, and modulation orders corresponding to the MCS index interval from 47 to 51 progressively increase.

TABLE 3

| MCS index $I_{MCS}$ | Modulation order $Q_m$ | Modulation order $Q_m'$ | Transport block set index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 4 |
| 6 | 2 | 4 | 5 |
| 7 | 2 | 4 | 6 |
| 8 | 2 | 4 | 7 |
| 9 | 2 | 4 | 8 |
| 10 | 2 | 4 | 9 |
| 11 | 4 | 4 | 10 |
| 12 | 4 | 4 | 11 |
| 13 | 4 | 4 | 12 |
| 14 | 4 | 6 | 12 |
| 15 | 4 | 6 | 13 |
| 16 | 4 | 6 | 14 |
| 17 | 4 | 6 | 15 |
| 18 | 4 | 6 | 16 |
| 19 | 4 | 6 | 17 |
| 20 | 4 | 6 | 18 |
| 21 | 6 | 6 | 18 |
| 22 | 6 | 6 | 19 |
| 23 | 6 | 6 | 20 |
| 24 | 6 | 6 | 21 |
| 25 | 6 | 6 | 22 |
| 26 | 6 | 6 | 23 |
| 27 | 6 | 8 | 23 |
| 28 | 6 | 8 | 24 |
| 29 | 6 | 8 | 25 |
| 30 | 6 | 8 | 26 |
| 31 | 6 | 8 | 27 |
| 32 | 6 | 8 | 28 |
| 33 | 8 | 8 | 28 |
| 34 | 8 | 8 | 29 |
| 35 | 8 | 8 | 30 |
| 36 | 8 | 8 | 31 |
| 37 | 8 | 8 | 32 |
| 38 | 8 | 8 | 33 |
| 39 | 8 | 8 | 34 |
| 40 | 8 | 8 | 35 |
| 41 | 8 | 8 | 36 |
| 42 | 8 | 8 | 37 |
| 43 | 8 | 8 | 38 |
| 44 | 8 | 8 | 39 |
| 45 | 8 | 8 | 40 |
| 46 | 8 | 8 | 41 |
| 47 | 2 | 2 | Reserved |
| 48 | 4 | 4 | |
| 49 | 6 | 6 | |
| 50 | 8 | 8 | |

It should be understood that the data presented in Table 3 is only an example, and there may be one or more MCS index values corresponding to the reserved field. For example, MCS indexes corresponding to reserved in Table 3 are 47 to 50, or may be other values. This is not limited in this application.

That 256 QAM modulation is used in downlink (an MCS occupies six bits and occupies all the six bits, the six bits may represent a total of 64 MCS index values, and "occupy all the six bits" means that all the 64 values are used to represent the MCS) is used as an example. As shown in Table 4, there is a correspondence between each MCS index $I_{MCS}$ and each of a modulation order $Q_m$, a modulation order $Q'_m$, and a transport block set index $I_{TBS}$. It may be understood that a form of Table 4 is merely a possible implementation, and in another implementation, implementation may not be performed in the form of Table 4. For example, there is a correspondence between an MCS index $I_{MCS}$ and at least one of a modulation order $Q_m$, a modulation order $Q'_m$, and a transport block set index $I_{TBS}$, and the correspondence may be represented in a form of one or more tables.

Table 4 is used as an example. A same modulation order $Q_m$ or a same modulation order $Q'_m$ corresponds to one or more MCS indexes. For example, if the modulation order $Q_m$ is 2, the modulation order may correspond to MCS indexes 0 to 14 and 60; and if the modulation order $Q_m$ is 4, the modulation order may correspond to MCS indexes 15 to 26 and 61. Therefore, modulation orders corresponding to MCS indexes 0 to 63 do not always progressively increase. Modulation orders corresponding to an MCS index interval from 0 to 59 increase, but modulation orders corresponding to MCSs in an MCS index interval from 60 to 63 are less than or equal to a modulation order corresponding to an MCS index 59, and modulation orders corresponding to the MCS index interval from 60 to 63 progressively increase.

TABLE 4

| MCS index $I_{MCS}$ | Modulation order $Q_m$ | Modulation order $Q_m'$ | Transport block set index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 2 | 4 |
| 6 | 2 | 2 | 5 |
| 7 | 2 | 2 | 6 |
| 8 | 2 | 2 | 7 |
| 9 | 2 | 2 | 8 |
| 10 | 2 | 2 | 9 |
| 11 | 2 | 4 | 9 |
| 12 | 2 | 4 | 10 |
| 13 | 2 | 4 | 11 |
| 14 | 2 | 4 | 12 |
| 15 | 4 | 4 | 12 |
| 16 | 4 | 4 | 13 |
| 17 | 4 | 4 | 14 |
| 18 | 4 | 4 | 15 |
| 19 | 4 | 4 | 16 |
| 20 | 4 | 4 | 17 |
| 21 | 4 | 4 | 18 |
| 22 | 4 | 6 | 18 |
| 23 | 4 | 6 | 19 |
| 24 | 4 | 6 | 20 |
| 25 | 4 | 6 | 21 |
| 26 | 4 | 6 | 22 |
| 27 | 6 | 6 | 22 |
| 28 | 6 | 6 | 23 |
| 29 | 6 | 6 | 24 |
| 30 | 6 | 6 | 25 |
| 31 | 6 | 6 | 26 |
| 32 | 6 | 6 | 27 |
| 33 | 6 | 6 | 28 |
| 34 | 6 | 6 | 29 |
| 35 | 6 | 8 | 30 |
| 36 | 6 | 8 | 31 |
| 37 | 6 | 8 | 32 |
| 38 | 6 | 8 | 33 |
| 39 | 6 | 8 | 34 |
| 40 | 6 | 8 | 35 |
| 41 | 6 | 8 | 36 |
| 42 | 8 | 8 | 36 |
| 43 | 8 | 8 | 37 |
| 44 | 8 | 8 | 38 |
| 45 | 8 | 8 | 39 |
| 46 | 8 | 8 | 40 |
| 47 | 8 | 8 | 41 |

TABLE 4-continued

| MCS index $I_{MCS}$ | Modulation order $Q_m$ | Modulation order $Q_m'$ | Transport block set index $I_{TBS}$ |
|---|---|---|---|
| 48 | 8 | 8 | 42 |
| 49 | 8 | 8 | 43 |
| 50 | 8 | 8 | 44 |
| 51 | 8 | 8 | 45 |
| 52 | 8 | 8 | 46 |
| 53 | 8 | 8 | 47 |
| 54 | 8 | 8 | 48 |
| 55 | 8 | 8 | 49 |
| 56 | 8 | 8 | 50 |
| 57 | 8 | 8 | 51 |
| 58 | 8 | 8 | 52 |
| 59 | 8 | 8 | 53 |
| 60 | 2 | 2 | Reserved |
| 61 | 4 | 4 | |
| 62 | 6 | 6 | |
| 63 | 8 | 8 | |

It should be understood that the data presented in Table 4 is only an example, and there may be one or more MCS index values corresponding to the reserved field. For example, MCS indexes corresponding to reserved in Table 4 are 60 to 63, or may be other values. This is not limited in this application.

That 256 QAM is used in uplink, and a quantity of redundancy versions is 4 (to be specific, a largest redundancy version index is 3) is used as an example. As shown in Table 5, there is a correspondence between each MCS index $I_{MCS}$ and each of a modulation order Q a transport block set index $I_{TBS}$, and a redundancy version RV. It may be understood that a form of Table 5 is merely a possible implementation, and in another implementation, implementation may not be performed in the form of Table 5. For example, there is a correspondence between an MCS index $I_{MCS}$ and at least one of a modulation order $Q'_m$, a transport block set index $I_{TBS}$, and a redundancy version number (which may also be referred to as a redundancy version index) RVidx, and the correspondence may be represented in a form of one or more tables.

Table 5 is used as an example. A same modulation order $Q'_m$ corresponds to one or more MCS indexes. Modulation orders and transport block set indexes $I_{TBS}$ corresponding to an MCS index interval from 0 to 28 increase, redundancy version indexes RVidx corresponding to the MCS index interval from 0 to 28 are 0, but modulation orders and transport block set indexes corresponding to MCS indexes 29, 30, and 31 are reserved reserved, and redundancy version indexes RVidx corresponding to the MCS indexes 29, 30, and 31 are respectively 1, 2, and 3.

TABLE 5

| MCS index $I_{MCS}$ | Modulation order $Q_m'$ | Transport block set index $I_{TBS}$ | Redundancy version RVidx |
|---|---|---|---|
| 0 | 2 | 0 | 0 |
| 1 | 2 | 2 | 0 |
| 2 | 2 | 4 | 0 |
| 3 | 2 | 6 | 0 |
| 4 | 2 | 8 | 0 |
| 5 | 2 | 10 | 0 |
| 6 | 4 | 11 | 0 |
| 7 | 4 | 12 | 0 |
| 8 | 4 | 13 | 0 |
| 9 | 4 | 14 | 0 |
| 10 | 4 | 16 | 0 |
| 11 | 4 | 17 | 0 |
| 12 | 4 | 18 | 0 |
| 13 | 4 | 19 | 0 |
| 14 | 6 | 20 | 0 |
| 15 | 6 | 21 | 0 |
| 16 | 6 | 22 | 0 |
| 17 | 6 | 23 | 0 |
| 18 | 6 | 24 | 0 |
| 19 | 6 | 25 | 0 |
| 20 | 6 | 27 | 0 |
| 21 | 6 | 28 | 0 |
| 22 | 6 | 29 | 0 |
| 23 | 8 | 30 | 0 |
| 24 | 8 | 31 | 0 |
| 25 | 8 | 32 | 0 |
| 26 | 8 | 32A | 0 |
| 27 | 8 | 33 | 0 |
| 28 | 8 | 34 | 0 |
| 29 | Reserved | | 1 |
| 30 | | | 2 |
| 31 | | | 3 |

It should be understood that the data presented in Table 5 is only an example, and there may be one or more MCS index values corresponding to the reserved field. For example, MCS indexes corresponding to reserved in Table 5 are 29 to 31, or may be other values. This is not limited in this application.

That 64 QAM is used in uplink, and a quantity of redundancy versions is 4 (to be specific, a largest redundancy version index is 3) is used as an example. As shown in Table 6, there is a correspondence between each MCS index $I_{MCS}$ and each of a modulation order $Q'_m$, a transport block set index $I_{TBS}$, and a redundancy version index RVidx. It may be understood that a form of Table 6 is merely a possible implementation, and in another implementation, implementation may not be performed in the form of Table 6. For example, there is a correspondence between an MCS index $I_{MCS}$ and at least one of a modulation order $Q'_m$, a transport block set index $I_{TBS}$, and a redundancy version index RVidx, and the correspondence may be represented in a form of one or more tables.

Table 6 is used as an example. A same modulation order $Q'_m$ corresponds to one or more MCS indexes. Modulation orders and transport block set indexes $I_{TBS}$ corresponding to an MCS index interval from 0 to 31 increase, redundancy version indexes RVidx corresponding to an MCS index interval from 0 to 28 are 0. However, modulation orders and transport block set indexes corresponding to MCS indexes 29, 30, and 31 are reserved reserved, and redundancy version indexes RVidx corresponding to the MCS indexes 29, 30, and 31 are respectively 1, 2, and 3.

TABLE 6

| MCS index $I_{MCS}$ | Modulation order $Q_m'$ | Transport block set index $I_{TBS}$ | Redundancy version RVidx |
|---|---|---|---|
| 0 | 2 | 0 | 0 |
| 1 | 2 | 2 | 0 |
| 2 | 2 | 4 | 0 |
| 3 | 2 | 6 | 0 |
| 4 | 2 | 8 | 0 |
| 5 | 2 | 10 | 0 |
| 6 | 2 | 11 | 0 |
| 7 | 2 | 12 | 0 |
| 8 | 2 | 13 | 0 |

TABLE 6-continued

| MCS index $I_{MCS}$ | Modulation order $Q_m'$ | Transport block set index $I_{TBS}$ | Redundancy version RVidx |
|---|---|---|---|
| 9 | 2 | 14 | 0 |
| 10 | 2 | 16 | 0 |
| 11 | 2 | 17 | 0 |
| 12 | 2 | 18 | 0 |
| 13 | 2 | 19 | 0 |
| 14 | 4 | 20 | 0 |
| 15 | 4 | 21 | 0 |
| 16 | 4 | 22 | 0 |
| 17 | 4 | 23 | 0 |
| 18 | 4 | 24 | 0 |
| 19 | 4 | 25 | 0 |
| 20 | 4 | 27 | 0 |
| 21 | 4 | 28 | 0 |
| 22 | 4 | 29 | 0 |
| 23 | 6 | 30 | 0 |
| 24 | 6 | 31 | 0 |
| 25 | 6 | 32 | 0 |
| 26 | 6 | 32A | 0 |
| 27 | 6 | 33 | 0 |
| 28 | 6 | 34 | 0 |
| 29 | Reserved | | 1 |
| 30 | | | 2 |
| 31 | | | 3 |

It should be understood that the data presented in Table 6 is only an example, and there may be one or more MCS index values corresponding to the reserved field. For example, MCS indexes corresponding to reserved in Table 6 are 29 to 31, or may be other values. This is not limited in this application.

That 256 QAM is used in uplink, and a quantity of redundancy versions is 8 (to be specific, a largest redundancy version index is 7) is used as an example. As shown in Table 7, there is a correspondence between each MCS index $I_{MCS}$ and each of a modulation order $Q'_m$, a transport block set index $I_{TBS}$, and a redundancy version index RVidx. It may be understood that a form of Table 7 is merely a possible implementation, and in another implementation, implementation may not be performed in the form of Table 7. For example, there is a correspondence between an MCS index $I_{MCS}$ and at least one of a modulation order $Q'_m$, a transport block set index $I_{TBS}$, and a redundancy version index RVidx, and the correspondence may be represented in a form of one or more tables.

Table 7 is used as an example. A same modulation order $Q'_m$ corresponds to one or more MCS indexes. Modulation orders and transport block set indexes $I_{TBS}$ corresponding to an MCS index interval from 0 to 28 increase, redundancy version indexes RVidx corresponding to the MCS index interval from 0 to 28 are 0, but modulation orders and transport block set indexes corresponding to an MCS index interval from 29 to 35 are reserved reserved, and redundancy version indexes RVidx corresponding to the MCS index interval from 29 to 35 are respectively 1 to 7.

TABLE 7

| MCS index $I_{MCS}$ | Modulation order $Q_m'$ | Transport block set index $I_{TBS}$ | Redundancy version RVidx |
|---|---|---|---|
| 0 | 2 | 0 | 0 |
| 1 | 2 | 2 | 0 |
| 2 | 2 | 4 | 0 |
| 3 | 2 | 6 | 0 |
| 4 | 2 | 8 | 0 |
| 5 | 2 | 10 | 0 |
| 6 | 4 | 11 | 0 |
| 7 | 4 | 12 | 0 |
| 8 | 4 | 13 | 0 |
| 9 | 4 | 14 | 0 |
| 10 | 4 | 16 | 0 |
| 11 | 4 | 17 | 0 |
| 12 | 4 | 18 | 0 |
| 13 | 4 | 19 | 0 |
| 14 | 6 | 20 | 0 |
| 15 | 6 | 21 | 0 |
| 16 | 6 | 22 | 0 |
| 17 | 6 | 23 | 0 |
| 18 | 6 | 24 | 0 |
| 19 | 6 | 25 | 0 |
| 20 | 6 | 27 | 0 |
| 21 | 6 | 28 | 0 |
| 22 | 6 | 29 | 0 |
| 23 | 8 | 30 | 0 |
| 24 | 8 | 31 | 0 |
| 25 | 8 | 32 | 0 |
| 26 | 8 | 32A | 0 |
| 27 | 8 | 33 | 0 |
| 28 | 8 | 34 | 0 |
| 29 | Reserved | | 1 |
| 30 | | | 2 |
| 31 | | | 3 |
| 32 | | | 4 |
| 33 | | | 5 |
| 34 | | | 6 |
| 35 | | | 7 |

It should be understood that the data presented in Table 7 is only an example, and there may be one or more MCS index values corresponding to the reserved field. For example, MCS indexes corresponding to reserved in Table 7 are 29 to 35, or may be other values. This is not limited in this application.

That 256 QAM is used in uplink, and a quantity of redundancy versions is 8 (to be specific, a largest redundancy version index is 7) is used as an example. As shown in Table 8, there is a correspondence between each MCS index $I_{MCS}$ and each of a modulation order Q a transport block set index $I_{TBS}$, and a redundancy version index RVidx. It may be understood that a form of Table 8 is merely a possible implementation, and in another implementation, implementation may not be performed in the form of Table 8. For example, there is a correspondence between an MCS index $I_{MCS}$ and at least one of a modulation order $Q'_m$, a transport block set index $I_{TBS}$, and a redundancy version index RVidx, and the correspondence may be represented in a form of one or more tables. Therefore, modulation orders corresponding to an MCS index interval from 0 to 41 do not always progressively increase.

Table 8 is used as an example. A same modulation order $Q'_m$ corresponds to one or more MCS indexes. Modulation orders and transport block set indexes $I_{TBS}$ corresponding to an MCS index interval from 0 to 34 increase, redundancy version indexes RVidx corresponding to the MCS index interval from 0 to 28 are 0, but modulation orders and transport block set indexes corresponding to an MCS index interval from 35 to 41 are reserved reserved, and redundancy version indexes RVidx corresponding to the MCS index interval from 35 to 41 are respectively 1 to 7.

TABLE 8

| MCS index $I_{MCS}$ | Modulation order $Q_m'$ | Transport block set index $I_{TBS}$ | Redundancy version RVidx |
|---|---|---|---|
| 0 | 2 | 0 | 0 |
| 1 | 2 | 2 | 0 |
| 2 | 2 | 4 | 0 |
| 3 | 2 | 6 | 0 |
| 4 | 2 | 8 | 0 |
| 5 | 2 | 10 | 0 |
| 6 | 2 | 11 | 0 |
| 7 | 2 | 12 | 0 |
| 8 | 2 | 13 | 0 |
| 9 | 2 | 14 | 0 |
| 10 | 2 | 16 | 0 |
| 11 | 2 | 17 | 0 |
| 12 | 2 | 18 | 0 |
| 13 | 2 | 19 | 0 |
| 14 | 4 | 20 | 0 |
| 15 | 4 | 21 | 0 |
| 16 | 4 | 22 | 0 |
| 17 | 4 | 23 | 0 |
| 18 | 4 | 24 | 0 |
| 19 | 4 | 25 | 0 |
| 20 | 4 | 27 | 0 |
| 21 | 4 | 28 | 0 |
| 22 | 4 | 29 | 0 |
| 23 | 6 | 30 | 0 |
| 24 | 6 | 31 | 0 |
| 25 | 6 | 32 | 0 |
| 26 | 6 | 32A | 0 |
| 27 | 6 | 33 | 0 |
| 28 | 8 | 34 | 0 |
| 29 | 8 | 35 | 0 |
| 30 | 8 | 36 | 0 |
| 31 | 8 | 37 | 0 |
| 32 | 8 | 38 | 0 |
| 33 | 8 | 39 | 0 |
| 34 | 8 | 40 | 0 |
| 35 | | Reserved | 1 |
| 36 | | | 2 |
| 37 | | | 3 |
| 38 | | | 4 |
| 39 | | | 5 |
| 40 | | | 6 |
| 41 | | | 7 |

It should be understood that the data presented in Table 8 is only an example, and there may be one or more MCS index values corresponding to the reserved field. For example, MCS indexes corresponding to reserved in Table 8 are 35 to 41, or may be other values. This is not limited in this application.

In addition, another column may be defined in a standard based on Table 1 to Table 8. For example, Table 9 includes a code rate. There is a correspondence between each MCS index $I_{MCS}$ and each of a modulation order $Q_m$ and a code rate. It may be understood that a form of Table 9 is merely a possible implementation, and in another implementation, implementation may not be performed in the form of Table 9. For example, there is a correspondence between an MCS index $I_{MCS}$ and at least one of a modulation order $Q_m$ and a code rate, and the correspondence may be represented in a form of one or more tables. Therefore, modulation orders corresponding to the interval from 0 to 31 do not always progressively increase.

Table 9 is used as an example. A same modulation order $Q_m$ corresponds to one or more MCS indexes. Modulation orders corresponding to an MCS index interval from 0 to 27 increase, but code rates corresponding to an MCS index interval from 28 to 31 are reserved reserved, and modulation orders corresponding to the MCS index interval from 28 to 31 are respectively 2, 4, 6, and 8.

| MCS index $I_{MCS}$ | Modulation order $Q_m$ | Code rate R × 1024 |
|---|---|---|
| 0 | 2 | 120 |
| 1 | 2 | 193 |
| 2 | 2 | 308 |
| 3 | 2 | 449 |
| 4 | 2 | 602 |
| 5 | 4 | 378 |
| 6 | 4 | 434 |
| 7 | 4 | 490 |
| 8 | 4 | 553 |
| 9 | 4 | 616 |
| 10 | 4 | 658 |
| 11 | 6 | 466 |
| 12 | 6 | 517 |
| 13 | 6 | 567 |
| 14 | 6 | 616 |
| 15 | 6 | 666 |
| 16 | 6 | 719 |
| 17 | 6 | 772 |
| 18 | 6 | 822 |
| 19 | 6 | 873 |
| 20 | 8 | 682.5 |
| 21 | 8 | 711 |
| 22 | 8 | 754 |
| 23 | 8 | 797 |
| 24 | 8 | 841 |
| 25 | 8 | 885 |
| 26 | 8 | 916.5 |
| 27 | 8 | 948 |
| 28 | 2 | Reserved |
| 29 | 4 | |
| 30 | 6 | |
| 31 | 8 | |

It should be understood that the data presented in Table 9 is only an example, and there may be one or more MCS index values corresponding to the reserved field. For example, MCS indexes corresponding to reserved in Table 9 are 27 to 31, or may be other values. This is not limited in this application.

A larger modulation and coding scheme (MCS) indicates that a larger density of a PTRS is required. Therefore, to flexibly configure a PTRS, the network device or the terminal device may flexibly configure a time domain density and a frequency domain density of a PTRS based on a currently scheduled MCS and an association relationship between an MCS threshold and a time domain density and a frequency domain density of a PTRS. For example, an association relationship between an MCS threshold and a time domain density of a PTRS may be shown in Table 9. Similarly, there may also be a similar association relationship between an MCS threshold and a frequency domain density of a PTRS. Herein, the association relationship between an MCS threshold and a time domain density of a PTRS is used as an example.

A threshold $T_{MCS}^4$ may be 1 plus an MCS corresponding to a largest transport block set index. For example, in the foregoing Table 1, the threshold $T_{MCS}^4$ may be 29. Because modulation orders corresponding to the MCSs 0 to 28 progressively increase, a time domain density of a PTRS may be flexibly set based on an association relationship in Table 2. For example, if a threshold $T_{MCS}^1$ is 6, a threshold $T_{MCS}^2$ is 10, a threshold $T_{MCS}^3$ is 17, and a threshold $T_{MCS}^4$ is 29, when a currently scheduled MCS is greater than or equal to 0 and is less than 6, it may be determined that the time domain density of the PTRS is 0; when a currently scheduled MCS is greater than or equal to 6 and is less than 10, it may be determined that the time domain density of the PTRS is 1/4; when a currently scheduled MCS is greater than or equal to 10 and is less than 17, it may be determined that the time domain density of the PTRS is 1/2; and when a currently scheduled MCS is greater than or equal to 17 and is less than 29, it may be determined that the time domain density of the PTRS is 1.

The MCS threshold may be determined based on a phase noise level of a network side or a terminal, and/or a capability of a receiver, and/or a subcarrier spacing, and/or a frequency, and/or a correspondence between a currently scheduled MCS and a transport block set index, and/or a correspondence between a currently scheduled MCS and a modulation order. To be specific, there may be an association relationship between different MCS thresholds and a time domain density and a frequency domain density of a PTRS based on different terminals, different subcarrier spacing, different frequencies, a correspondence between different MCSs and a transport block set index, and a correspondence between different MCSs and a modulation order. Optionally, any time domain density set or any frequency domain density set may be implemented by setting a same threshold, to be specific, when a threshold on the left is equal to a threshold on the right, this row is invalid. For example, (1) if $T_{MCS}^1 = T_{MCS}^2$, the time domain density in this case does not support 1/4; (2) if $T_{MCS}^1 = T_{MCS}^2$ and $T_{MCS}^2 = T_{MCS}^3$, the time domain density in this case supports only 0 and 1; and (3) a terminal with an ideal phase noise level may set all MCS thresholds to be equal to one another and equal to 1 plus a largest MCS directly corresponding to a transport block set index, so that the terminal may never schedule a PTRS. The frequency domain density is similar to the time domain density.

TABLE 9

Association relationship between an MCS threshold and a time domain density of a PTRS

| MCS threshold | Time domain density |
|---|---|
| $0 \leq MCS < T_{MCS}^1$ | 0 |
| $T_{MCS}^1 \leq MCS < T_{MCS}^2$ | 1/4 |
| $T_{MCS}^2 \leq MCS < T_{MCS}^3$ | 1/2 |
| $T_{MCS}^3 \leq MCS < T_{MCS}^4$ | 1 |

The association relationship between an MCS threshold and a time domain density of a PTRS may further be represented in a form of a formula, as shown in formula (1):

$$D_T = \begin{cases} 0 & 0 \leq MCS < T_{MCS}^1 \\ 1/4 & T_{MCS}^1 \leq MCS < T_{MCS}^2 \\ 1/2 & T_{MCS}^2 \leq MCS < T_{MCS}^3 \\ 1 & T_{MCS}^3 \leq MCS < T_{MCS}^4 \end{cases} \quad (1)$$

and $$D_T = \begin{cases} 0 & 0 \leq MCS \leq T_{MCS}^1 \\ 1/4 & T_{MCS}^1 < MCS \leq T_{MCS}^2 \\ 1/2 & T_{MCS}^2 < MCS \leq T_{MCS}^3 \\ 1 & T_{MCS}^3 < MCS \leq T_{MCS}^4 \end{cases} \quad (2)$$

where $D_T$ represents a time domain density.

It should be understood that Table 2 and formula (1) are merely examples of the association relationship between an MCS threshold and a time domain density of a PTRS. The association relationship between an MCS threshold and a time domain density of a PTRS may be represented in another form, for example, an equal sign may be set on the right, as shown in formula (2). This is not limited in this application. In addition, the time domain density in Table 2 and formula (1) is merely an example, and may be represented in another form in which one PTRS is sent every symbol, every two symbols, or every four symbols. This is not limited in this application.

It can be learned that when a current modulation order is greater than or equal to the threshold $T_{MCS}^4$, a time-frequency resource of a PTRS cannot be flexibly configured based on the association relationship between an MCS threshold and a time domain density and a frequency domain density of a PTRS. For example, when the correspondence between an MCS and each of a modulation order and a transport block set index is shown in Table 1, the threshold $T_{MCS}^4$ is 29. If the current modulation order is 29, 30, or 31, the time-frequency resource of the PTRS cannot be flexibly configured based on the association relationship between an MCS threshold and a time domain density and a frequency domain density of a PTRS. Therefore, the embodiments of this application provide a wireless communication method and a device, to resolve a problem of how to flexibly configure the time-frequency resource of the PTRS when the current modulation order is greater than the threshold $T_{MCS}^4$.

It should be understood that a frequency domain density needs to be further determined when a PTRS is mapped. The frequency domain density of the PTRS means subcarriers or REs to which the PTRS is mapped in frequency domain. The frequency domain density of the PTRS may be related to at least one of a CP type, the user scheduling bandwidth, a subcarrier spacing, and a modulation order. In other words, a total quantity $L_{PTRS}$ of subcarriers to which the PTRS is mapped in the user scheduling bandwidth may be related to the at least one of the CP type, the user scheduling bandwidth, the subcarrier spacing, and the modulation order.

Specifically, there is a correspondence between a frequency domain density of a PTRS and at least one of a CP type, the user scheduling bandwidth, a subcarrier spacing, and a modulation order. Different CP types, different user scheduling bandwidth, different subcarrier spacings, or different modulation orders correspond to different frequency domain densities. Specifically, the correspondence may be predefined in a protocol, or may be configured by the network device by using higher layer signaling (such as RRC signaling).

Specifically, for one determined subcarrier spacing, one or more scheduling bandwidth thresholds may be predefined or may be configured by using the higher layer signaling, and all scheduling bandwidth between two adjacent scheduling bandwidth thresholds corresponds to a same frequency domain density of the PTRS. This may be shown in Table 10.

TABLE 10

| Scheduling bandwidth threshold | Frequency domain density (a quantity of subcarriers in each resource block) |
|---|---|
| $0 \leq BW < BW\_1$ | 0 |
| $BW\_1 \leq BW < BW\_2$ | 1 |
| $BW\_2 \leq BW < BW\_3$ | 1/2 |
| $BW\_3 \leq BW < BW\_4$ | 1/4 |
| $BW\_4 \leq BW < BW\_5$ | 1/8 |
| $BW\_5 \leq BW$ | 1/16 |

The BW_1, the BW_2, the BW_3, the BW_4, and the BW_5 are scheduling bandwidth thresholds, and a meaning of the scheduling bandwidth threshold may be a quantity of resource blocks included in available scheduling bandwidth, or may be a frequency domain span corresponding to scheduling bandwidth. This is not limited herein. The frequency domain density "1/2" indicates that every two resource blocks of the PTRS occupy one subcarrier. Meanings of the frequency domain densities "1/4", "1/8", and "1/16" may be analogous, and details are not described herein again.

Specifically, in the determined subcarrier spacing, the frequency domain density of the PTRS may be determined based on a scheduling bandwidth threshold interval within which actual scheduling bandwidth BW falls. For example, it is assumed that Table 10 represents a scheduling bandwidth threshold at a default subcarrier spacing SCS_1=15 KHz. If the actual scheduling bandwidth BW falls within an interval [BW_2, BW_3], the frequency domain density of the PTRS is 1/2. This example is merely used to explain this embodiment of the present invention, and shall not be construed as a limitation.

In this application, different subcarrier spacings may correspond to different scheduling bandwidth thresholds. In other words, for the different subcarrier spacings, a correspondence table between different scheduling bandwidth thresholds and a time domain density may be configured.

Specifically, scheduling bandwidth thresholds respectively corresponding to the different subcarrier spacings may be predefined in a protocol, or may be configured by the network device by using higher layer signaling (such as RRC signaling).

In some optional embodiments, the default subcarrier spacing (represented as SCS_1) such as 15 kHz and one or more default scheduling bandwidth thresholds (represented as BW') corresponding to the default subcarrier spacing may be predefined in the protocol or may be configured by using the higher layer signaling. In addition, for another non-default subcarrier spacing, a corresponding scheduling bandwidth offset value (represented as BW_offset, which is an integer) may be predefined in the protocol or may be configured by using the higher layer signaling, and BW_offset+BW=BW', where BW represents actual scheduling bandwidth in the another non-default subcarrier spacing. In the another non-default subcarrier spacing, the frequency domain density of the PTRS may be determined by using the actual scheduling bandwidth BW and the scheduling bandwidth offset value BW_offset.

For example, if Table 11 indicates a scheduling bandwidth threshold in the default subcarrier spacing SCS_1=15 KHz, the frequency domain density of the PTRS is 1 if the value that is obtained by adding the actual scheduling bandwidth BW and BW_offset falls within an interval [BW_1, BW_2] in a non-default subcarrier spacing of 60 Hz. If the value that is obtained by adding the actual modulation order BW and BW_offset falls within an interval [BW_2, BW_3], the frequency domain density of the PTRS is 1/2. This example is merely used to explain this embodiment of the present invention, and shall not be construed as a limitation.

TABLE 11

| Scheduling bandwidth threshold | Frequency domain density (a quantity of subcarriers in each resource block) |
|---|---|
| 0 <= BW' < BW_1 | 0 |
| BW_1 <= BW' < BW_2 | 1 |
| BW_2 <= BW' < BW_3 | ½ |
| BW_3 <= BW' < BW_4 | ¼ |

TABLE 11-continued

| Scheduling bandwidth threshold | Frequency domain density (a quantity of subcarriers in each resource block) |
|---|---|
| BW_4 <= BW' < BW_5 | ⅛ |
| BW_5 <= BW' | 1/16 |

In some optional embodiments, the default subcarrier spacing (represented as SCS_1) and one or more default scheduling bandwidth thresholds (represented as BW') corresponding to the default subcarrier spacing may be predefined in the protocol or may be configured by using the higher layer signaling. In addition, for another non-default subcarrier spacing (represented as SCS_n), a corresponding scale factor (0<<1) may be predefined in the protocol or may be configured by using the higher layer signaling, and that β=SCS_n/SCS_1 may be defined. In another non-default subcarrier spacing, a default scheduling bandwidth threshold interval within which the BW falls may be determined by using the actual scheduling bandwidth BW and the default scheduling bandwidth threshold BW', and then an actual frequency domain density of the PTRS may be determined by multiplying a frequency domain density corresponding to the default scheduling bandwidth threshold interval by the scale factor.

For example, if Table 4 indicates a modulation order threshold in the default subcarrier spacing SCS_1=60 KHz, an actual frequency domain density of the PTRS is a frequency domain density closest to a product of the frequency domain density "1/4" and the scale factor β if the actual scheduling bandwidth BW falls within [BW_3, BW_4] in a non-default subcarrier spacing of 120 Hz. Because β=120/60=2, the actual time domain density of the PTRS is 1/2. This example is merely used to explain this embodiment of the present invention, and shall not be construed as a limitation.

The following further describes a wireless communication method and a device provided in this application.

Figure 2A:
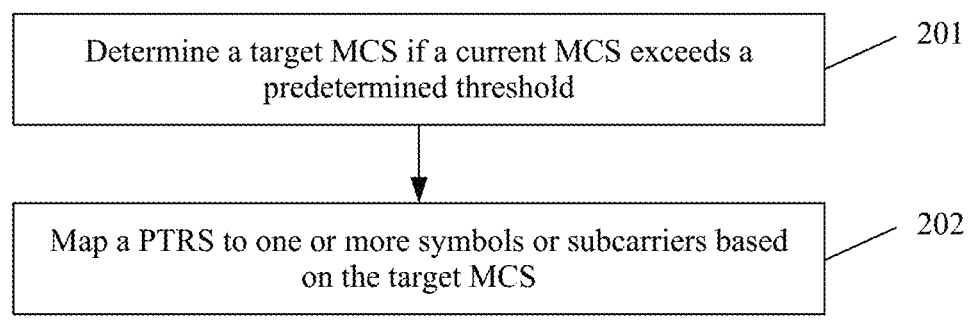
FIG. 2A is a schematic flowchart of a wireless communication method according to an embodiment of this application.

FIG. 2A is a wireless communication method according to an embodiment of this application. The wireless communication method may be applied to a network device or a terminal device.

As shown in FIG. 2A, the wireless communication method includes the following parts 201 to 202.

201. Determine a target MCS if a current MCS exceeds a predetermined threshold.

202. Map a PTRS to one or more symbols or subcarriers based on the target MCS.

In this embodiment of this application, the determining a target MCS may be implemented in a plurality of manners, and the target MCS is an MCS less than or equal to the predetermined threshold.

The predetermined threshold may be one of the following: an MCS corresponding to a largest transport block set index, an MCS corresponding to a largest redundancy version index Rvidx, an MCS corresponding to a largest code rate, 1 plus an MCS corresponding to a largest transport block set index, 1 plus an MCS corresponding to a largest redundancy version Rvidx, and 1 plus an MCS corresponding to a largest code rate, to be specific, the foregoing threshold $T_{MCS}^4$. If the predetermined threshold is an MCS corresponding to a largest transport block size, the target MCS may be an MCS less than or equal to the predetermined threshold. If the predetermined threshold is 1 plus an MCS corresponding to a largest transport block size, the target MCS may be an MCS less than the predetermined threshold. The foregoing Table 1 is used as an example. If $T_{MCS}^4$ is 29, the predetermined threshold may be 28 or 29. If the predetermined threshold is 28, the target MCS is an MCS less than or equal to 28. If the predetermined threshold is 29, the target MCS is an MCS less than 29.

An MCS or a value of $I_{MCS}$ may be determined, and the target MCS is determined based on the MCS or the value of the $I_{MCS}$. When $I_{MCS}>28$ or $I_{MCS}\geq29$, the target MCS needs to be determined; or when the transport block set index is reserved, the target MCS needs to be determined.

The foregoing Table 2 is used as an example. If $T_{MCS}^4$ is 28, the predetermined threshold may be 27 or 28. In other words, when the current $I_{MCS}>27$ or $I_{MCS}\geq28$, the target MCS is determined; or when the transport block set index $I_{TBS}$ is reserved, the target MCS is determined; or the target MCS is determined during retransmission; or when the modulation order $Q_m$ or $Q'_m$ decreases, the target MCS is determined. The foregoing Table 3 is used as an example. If $T_{MCS}^4$ is 47, the predetermined threshold may be 46 or 47. In other words, when $I_{MCS}>46$ or $I_{MCS}\geq47$, the target MCS is determined; or when the transport block set index $I_{TBS}$ is reserved, the target MCS is determined; or the target MCS is determined during retransmission; or when the modulation order $Q_m$ or $Q'_m$ decreases, the target MCS is determined.

Table 4 is used as an example. When $I_{MCS}>59$ or $I_{MCS}\geq60$, the target MCS is determined; or when the transport block set index $I_{TBS}$ is reserved, the target MCS is determined; or the target MCS is determined during retransmission; or when the modulation order $Q_m$ or $Q'_m$ decreases, the target MCS is determined.

Table 5 is used as an example. When $I_{MCS}>28$ or $I_{MCS}\geq29$, the target MCS is determined; or when the transport block set index $I_{TBS}$ is reserved, the target MCS is determined; or the target MCS is determined during retransmission; or when the modulation order is reserved, the target MCS is determined; or when the redundancy version number RVidx is 1, 2, or 3, the target MCS is determined.

Table 6 is used as an example. When $I_{MCS}>28$ or $I_{MCS}\geq29$, the target MCS is determined; or when the transport block set index $I_{TBS}$ is reserved, the target MCS is determined; or the target MCS is determined during retransmission; or when the modulation order is reserved, the target MCS is determined; or when the redundancy version number RVidx is 1, 2, or 3, the target MCS is determined.

Table 7 is used as an example. When $I_{MCS}>28$ or $I_{MCS}\geq29$, the target MCS is determined; or when the transport block set index $I_{TBS}$ is reserved, the target MCS is determined; or the target MCS is determined during retransmission; or when the modulation order is reserved, the target MCS is determined; or when the redundancy version number RVidx is 1 to 7, the target MCS is determined.

Table 8 is used as an example. When $I_{MCS}>34$ or $I_{MCS}\geq35$, the target MCS is determined; or when the transport block set index $I_{TBS}$ is reserved, the target MCS is determined; or the target MCS is determined during retransmission; or when the modulation order is reserved, the target MCS is determined; or when the redundancy version number RVidx is 1 to 7, the target MCS is determined.

Table 9 is used as an example. When $I_{MCS}>27$ or $I_{MCS}\geq28$, the target MCS is determined; or when the transport block set index $I_{TBS}$ is reserved, the target MCS is determined; or the target MCS is determined during retransmission; or when the modulation order $Q_m$ or $Q'_m$ decreases, the target MCS is determined; or when the code rate is reserved, the target MCS is determined.

In a possible design:
the target modulation and coding scheme MCS is determined if a transport block TBS index corresponding to a current MCS is reserved, where an index value of the target MCS is less than an index value of the current MCS; and
a phase tracking reference signal PTRS is mapped to one or more symbols or a plurality of subcarriers based on the target MCS.

In another possible design:
the target modulation and coding scheme MCS is determined if a code rate corresponding to a current MCS is reserved reserved, where an index value of the target MCS is less than an index value of the current MCS; and
a phase tracking reference signal PTRS is mapped to one or more symbols or a plurality of subcarriers based on the target MCS.

In still another possible design:
if current data is retransmitted, the target modulation and coding scheme MCS is determined based on an MCS used in the retransmitted data, where an index value of the target MCS is less than an index value of the MCS used in the current data; and
a phase tracking reference signal PTRS is mapped to one or more symbols or a plurality of subcarriers based on the target MCS.

In yet another possible design:
the target modulation and coding scheme MCS is determined if an index value of a redundancy version corresponding to a current MCS is greater than 0, where an index value of the target MCS is less than an index value of the current MCS; and
a phase tracking reference signal PTRS is mapped to one or more symbols or a plurality of subcarriers based on the target MCS.

In yet another possible design:
information about a correspondence between a plurality of modulation and coding schemes MCSs and a modulation order is preconfigured or pre-stored, where one modulation order corresponds to a plurality of different MCSs;
the target MCS is determined if an index value of a currently used MCS is a largest index value in index values of a plurality of MCSs corresponding to a modulation order corresponding to the currently used MCS; and
a phase tracking reference signal PTRS is mapped to one or more symbols or a plurality of subcarriers based on the target MCS.

In this application, the MCS is a modulation and coding scheme used for data, and may be indicated by using an MCS index value. In this application, an MCS is sometimes used for description, and an MCS index value is sometimes used for description. However, persons skilled in the art may clearly understand a technical meaning thereof after reading. For the network device, an MCS may be determined based on a channel status (for example, a signal-to-noise ratio). Generally, a larger signal-to-noise ratio indicates a larger MCS index value. For the terminal device, a current MCS is notified by the network device by using downlink signaling, for example, the terminal device is notified of a specific MCS index value by using DCI.

When the wireless communication method is performed by the network device, the target MCS is determined in a plurality of implementations.

In a first implementation, a specific implementation of determining a target MCS may include: determining a target modulation order based on the current MCS; and determining an MCS corresponding to the target modulation order as the target MCS based on information about a correspondence between a modulation order and an MCS. The target modulation order is a modulation order corresponding to the current MCS. Through implementation of this implementation, the target MCS that is less than or equal to the predetermined threshold can be determined. Therefore, a time domain density and a frequency domain density of a PTRS are flexibly configured, and PTRS overheads are reduced.

For example, if the mapping relationship between an MCS and a modulation order is represented in the first column and the second column in Table 1, a mapping relationship between an MCS and a transport block set index is represented in the first column and the fourth column in Table 1, the current MCS is 29, and the predetermined threshold is 28, the target modulation order is determined as 2 based on the current MCS, in other words, the target modulation order is a modulation order corresponding to 29. The network device determines, as the target MCS based on the mapping relationship between an MCS in the first column and a modulation order in the second column in Table 1, an MCS that is less than 28 and that corresponds to the target modulation order 2, in other words, determines one of MCSs 0 to 9 as the target MCS.

Optionally, if the target modulation order corresponds to a plurality of MCSs, a largest MCS in the plurality of MCSs that correspond to the target modulation order and that are less than or equal to the predetermined threshold is determined as the target MCS. For example, if MCSs that correspond to the target modulation order 2 and that are less than the predetermined threshold are 0 to 9, 9 is determined as the target MCS. Through implementation of this implementation, the target MCS that is less than or equal to the predetermined threshold can be determined. Therefore, a time domain density and a frequency domain density of a PTRS are flexibly configured, and system performance is ensured when PTRS overheads are reduced.

Optionally, if the target modulation order corresponds to a plurality of MCSs, a smallest MCS in the plurality of MCSs that correspond to the target modulation order and that are less than or equal to the predetermined threshold is determined as the target MCS. For example, if MCSs corresponding to the target modulation order 2 are 0 to 9, 0 is determined as the target MCS. Through implementation of this implementation, the target MCS that is less than or equal to the predetermined threshold can be determined. Therefore, a time domain density and a frequency domain density of a PTRS are flexibly configured, and PTRS overheads are reduced.

Optionally, if the target modulation order corresponds to a plurality of MCSs, the target MCS may be any one of the plurality of MCSs that correspond to the target modulation order and that are less than or equal to the predetermined threshold except a largest MCS and a smallest MCS. For example, if MCSs that correspond to the target modulation order 2 and that are less than the predetermined threshold are 0 to 9, the target modulation order may be any one of the MCSs 1 to 8. Through implementation of this implementation, the target MCS that is less than or equal to the predetermined threshold can be determined. Therefore, a time domain density and a frequency domain density of a PTRS are flexibly configured, and PTRS overheads are reduced.

In a second implementation, a specific implementation of determining a target MCS may include: using, as the target MCS, an MCS used in initial transmission or an MCS used in last transmission. Optionally, the MCS used in initial transmission may be an MCS used in a quantity of bits during initial transmission. Optionally, the MCS used in last transmission may be an MCS to which a PTRS is mapped last time. Through implementation of this implementation, the target MCS that is less than or equal to the predetermined threshold can be determined. Therefore, a time domain density and a frequency domain density of a PTRS are flexibly configured, and PTRS overheads are reduced.

For example, if the MCS used in initial transmission is 23, the target MCS is still 23.

For another example, if the MCS used in last transmission is 25, the target MCS is still 25.

In a third implementation, a specific implementation of determining a target MCS may include: using the predetermined threshold as the target MCS. For example, if the predetermined threshold is 27, 27 is used as the target MCS; or if the predetermined threshold is 28, 28 is used as the target MCS. If the target MCS is larger, the determined time domain density and frequency domain density of the PTRS is larger, and therefore system performance can be ensured. Therefore, through implementation of this implementation, the target MCS that is less than or equal to the predetermined threshold can be determined. Therefore, a time domain density and a frequency domain density of a PTRS are flexibly configured, and system performance is ensured when PTRS overheads are reduced.

In a fourth implementation, a specific implementation of determining a target MCS may include: determining the target MCS based on a quantity of bits that currently need to be transmitted and current scheduling bandwidth. Through implementation of this implementation, the target MCS that is less than or equal to the predetermined threshold can be determined. Therefore, a time domain density and a frequency domain density of a PTRS are flexibly configured, and PTRS overheads are reduced.

In this implementation, specifically, the quantity of bits that currently need to be transmitted is used as a transport block size currently need to be transmitted, and a target transport block set index corresponding to both the transport block size currently need to be transmitted and the current scheduling bandwidth may be determined based on a mapping relationship between a transport block set index, and a transport block size and scheduling bandwidth; and an MCS corresponding to the target transport block set index is determined as the target MCS based on a mapping relationship between an MCS and a transport block set index.

For example, if the mapping relationship between an MCS and a modulation order is represented in the first column and the second column in Table 1, a mapping relationship between an MCS and a transport block set index is represented in the first column and the fourth column in Table 1, the current MCS is 30, and the predetermined threshold is 28, the network device obtains a quantity of bits (for example, 4968 bits) that need to be transmitted by the network device and current scheduling bandwidth (for example, eight resource blocks). A quantity of bits to be transmitted is considered as a transport block size. In a mapping relationship table between a transport block set index, and a transport block size and bandwidth, a target transport block set index equivalent to current transmission may be determined as 24 based on the 4968 bits and the eight resource blocks. In the mapping relationship between a transport block set index and an MCS, a unique MCS corresponding to the transport block set index 24 is 26, and 26 is used as the target MCS.

Optionally, if it is determined, based on the mapping relationship between an MCS and a transport block set index, that a plurality of MCSs correspond to the target transport block set index, the target modulation order corresponding to the current MCS may be determined, and an MCS that corresponds to the target modulation order and that is in the plurality of MCSs corresponding to the target transport block set index is used as the target MCS.

For example, if the mapping relationship between an MCS and a modulation order is represented in the first column and the second column in Table 1, a mapping relationship between an MCS and a transport block set index is represented in the first column and the fourth column in Table 1. The current MCS is 30, and the predetermined threshold is 28. The network device determines, based on a mapping relationship between a transport block set index, and a transport block size and scheduling bandwidth, that a target transport block set index corresponding to both the transport block size currently need to be transmitted and the current scheduling bandwidth is 15. MCSs corresponding to the target transport block set index 15 are 16 and 17. The target modulation order corresponding to the current MCS (that is, 30) is 4, a modulation order corresponding to an MCS 16 is 4, and a modulation order corresponding to an MCS 17 is 6. Therefore, 16 is used as the target MCS.

Optionally, the quantity of bits that currently need to be transmitted may be a transport block size in previous transmission or initial transmission in conventional LTE, or may be a quantity of bits carried in a code block group (CBG) retransmitted in a fifth generation new radio (5G NR). A process of obtaining a code block group may be configured by a network side, or may be obtained through calculation with reference to a coding rate in previous transmission, a current modulation order, and current scheduling bandwidth.

In a fifth implementation, a specific implementation of determining a target MCS may include: determining an MCS that is configured by using a physical downlink control channel and that is less than or equal to the predetermined threshold as the target MCS. Through implementation of this implementation, the target MCS that is less than or equal to the predetermined threshold can be determined. Therefore, a time domain density and a frequency domain density of a PTRS are flexibly configured, and PTRS overheads are reduced.

For example, when the current MCS is 29 and the predetermined threshold is 28, the MCS configured by the physical downlink control channel is obtained. If the MCS configured by the physical downlink control channel is 20 (that is, less than the predetermined threshold 28), 20 is determined as the target MCS.

Optionally, the MCS configured by the physical downlink control channel may be an MCS configured by a semi-static physical downlink control channel in a latest time.

When the wireless communication method is performed by the terminal device, the target MCS is determined in a plurality of implementations, for example, any one of the second to the fifth implementations mentioned above. Details are not described herein again.

In this embodiment of this application, after the target MCS is determined, a time domain density of a PTRS may be determined based on the target MCS and an association relationship between an MCS threshold and a time domain density of a PTRS, and the PTRS is mapped to one or more symbols based on the time domain density of the PTRS. Optionally, the symbol may be an orthogonal frequency division multiplexing (OFDM) symbol or a symbol of a single carrier. This is not limited in this embodiment of this application. Similarly, in this embodiment of the present invention, frequency domain density processing is not excessively limited. The frequency domain processing may be determined according to a table described in Table 10, or may be determined in another manner described in the prior art or a standard proposal.

For example, the association relationship between an MCS threshold and a PTRS time domain density is shown in the foregoing Table 2. The threshold $T_{MCS}^1$ is 6, the threshold $T_{MCS}^2$ is 10, the threshold $T_{MCS}^3$ is 17, and the threshold $T_{MCS}^4$ is 28. If the target MCS is 5, the target MCS is in an interval that is greater than or equal to 0 and less than $T_{MCS}^1$, and a time domain density corresponding to the interval is 0. Therefore, if the target MCS is 5, it is determined that the time domain density of the PTRS is 0, and a PTRS symbol is not mapped in time domain. Likewise, If the target MCS is 9, the target MCS is in an interval that is greater than or equal to $T_{MCS}^1$ and less than $T_{MCS}^2$, and a time domain density corresponding to the interval is 1/4. Therefore, if the target MCS is 9, it is determined that the time domain density of the PTRS is 1/4, and a PTRS is mapped to a symbol at the time domain density 1/4 in time domain. Likewise, If the target MCS is 15, the target MCS is in an interval that is greater than or equal to $T_{MCS}^2$ and less than $T_{MCS}^3$, and a time domain density corresponding to the interval is 1/2. Therefore, if the target MCS is 15, it is determined that the time domain density of the PTRS is 1/2, and a PTRS is mapped to a symbol at the time domain density 1/2 in time domain. Likewise, If the target MCS is 20, the target MCS is in an interval that is greater than or equal to $T_{MCS}^3$ and less than or equal to $T_{MCS}^4$, and a time domain density corresponding to the interval is 1. Therefore, if the target MCS is 20, it is determined that the time domain density of the PTRS is 1, and a PTRS is mapped to a symbol at the time domain density 1 in time domain.

Figure 3:
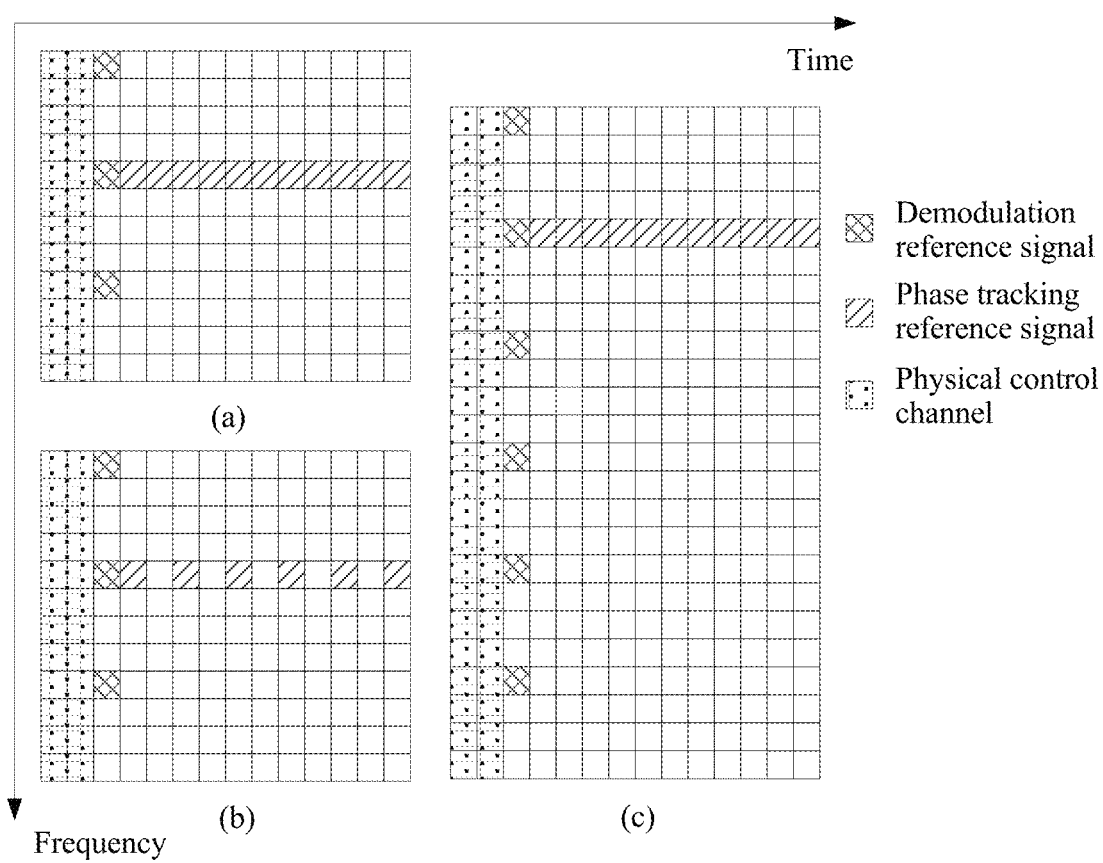
FIG. 3 is a schematic diagram of PTRS mapping according to an embodiment of this application.

For example, FIG. 3 is a schematic diagram of different PTRS mapping in a time-frequency resource. In this case, (a) in FIG. 3 is a schematic diagram of current PTRS mapping in a time-frequency resource. The time-frequency resource of the PTRS is determined based on the target MCS and the association relationship between an MCS threshold and a PTRS time domain density. The determined time-frequency resource of the PTRS may be (b) in FIG. 3 or (c) in FIG. 3. In (a), a frequency domain density of a PTRS is 1 (there is one PTRS on every 12 subcarriers), and a time domain density of a PTRS is 1. In (b), a frequency domain density of a PTRS is 1 (there is one PTRS on every 12 subcarriers), and a time domain density of a PTRS is 1/2; and in (c), a frequency domain density of a PTRS is 1/2 (there is one PTRS on every 24 subcarriers), and a time domain density of a PTRS is 1. It can be learned that a time-frequency resource of the PTRS is flexibly adjusted based on the target MCS, thereby reducing resource overheads of the PTRS.

Optionally, after the PTRS is mapped to one or more symbols or subcarriers, the symbol or the subcarrier to which the PTRS is mapped may be further sent.

For example, if the network device maps the PTRS to the one or more symbols or subcarriers based on the target MCS, the network device may further send, to the terminal device, the symbol or the subcarrier to which the PTRS is mapped. If the terminal device maps the PTRS to the one or more symbols or subcarriers based on the target MCS, the terminal device may further send, to the network device, the symbol or the subcarrier to which the PTRS is mapped.

It should be understood that the foregoing method may be performed by the network device or the terminal device. When the foregoing method is performed by the network device, the corresponding method is in downlink. When the foregoing method is performed by the terminal device, the corresponding method is in uplink.

It should be noted that when the method is performed by the network device, a terminal side may pre-store or pre-configure the foregoing Table 1 to Table 4.

When the method is performed by the terminal, any table in the foregoing Table 5 to Table 8 may be preconfigured or pre-stored in a memory of the terminal. A value of the current MCS may be received by using downlink signaling. For example, the signaling has a 5-bit or 6-bit field that is used to indicate the value of the modulation and coding scheme of current data of the terminal.

It can be learned that through implementation of the communication method described in FIG. 2A, when the current MCS exceeds the predetermined threshold, the target MCS that is less than or equal to the predetermined threshold may be determined, so that a density of a PTRS on a time-frequency resource may be flexibly determined based on the target MCS and the association relationship between an MCS threshold and a time domain density of a PTRS, thereby helping reduce resource overheads of the PTRS.

Figure 2B:
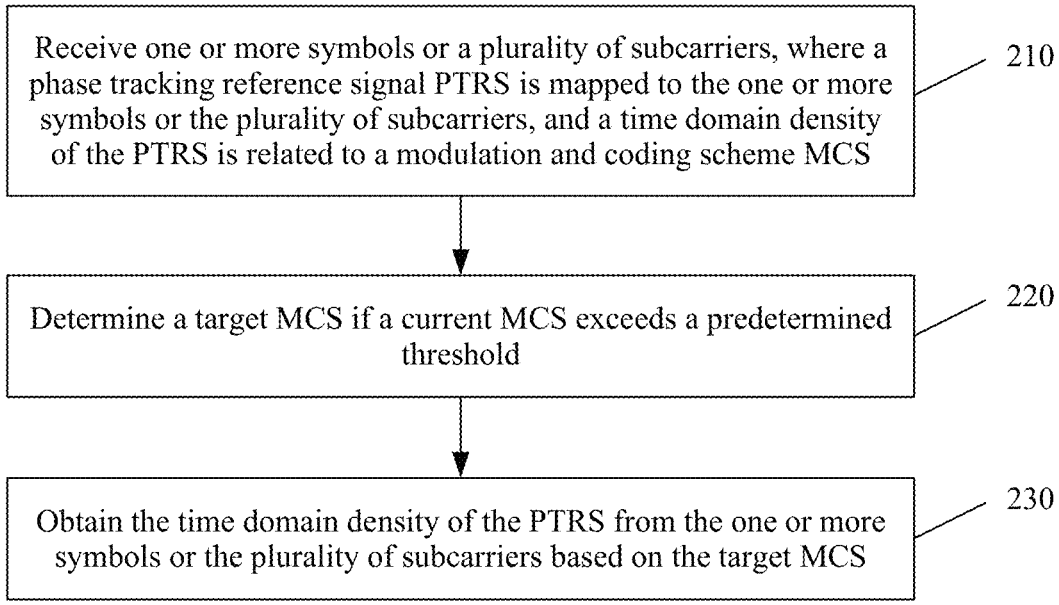
FIG. 2B is a schematic flowchart of another wireless communication method according to an embodiment of this application.

An embodiment of the present invention further provides a wireless communication method, and the wireless communication method may be applied to a terminal device or a network device. As shown in FIG. 2B, the wireless communication method includes the following parts 210 to 203.

210. Receive one or more symbols or a plurality of subcarriers, where a PTRS is mapped to the one or more symbols or the plurality of subcarriers, and a time domain density of the PTRS is related to a modulation and coding scheme MCS.

220. Determine a target MCS if a current MCS exceeds a predetermined threshold.

230. Obtain the PTRS from the one or more symbols or the plurality of subcarriers based on the target MCS.

Optionally, when the method is performed by the terminal device, the method further includes:

receiving downlink signaling from the network device, where the downlink signaling includes information used to indicate the current MCS.

For example, the downlink signaling is DCI, and the current MCS occupies 5 or 6 bits.

Optionally, the target MCS is determined in a plurality of manners, for example, in any one of the foregoing first to fifth implementations described above, and details are not described herein again.

Step 230 of obtaining the PTRS from the one or more symbols or the plurality of subcarriers based on the target MCS specifically includes:

obtaining a time domain density of the PTRS based on the target MCS and information about a correspondence between an MCS and a time domain density.

Figure 2C:
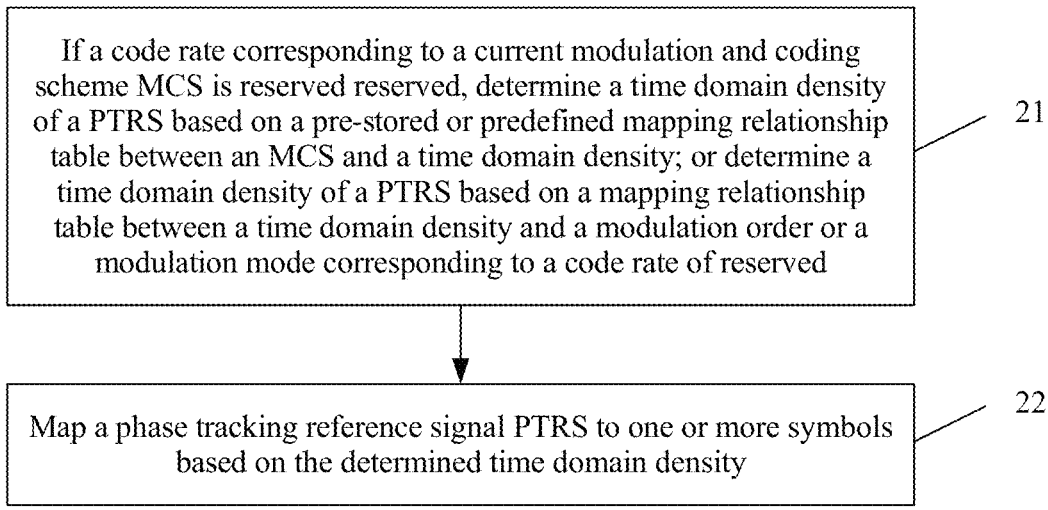
FIG. 2C is a schematic flowchart of still another wireless communication method according to an embodiment of this application.

As shown in FIG. 2C, FIG. 2C is another wireless communication method according to an embodiment of this application. The wireless communication method may be applied to a network device or a terminal device.

As shown in FIG. 2C, the wireless communication method includes the following parts 21 and 22.

21. If a code rate corresponding to a current modulation and coding scheme MCS is reserved reserved, determine a time domain density of a PTRS based on a pre-stored or predefined mapping relationship table between an MCS and a time domain density; or determine a time domain density of the PTRS based on a mapping relationship table between a time domain density and a modulation order or a modulation mode corresponding to a code rate of reserved.

22. Map a phase tracking reference signal PTRS to one or more symbols based on the determined time domain density.

For example, the pre-stored or predefined mapping relationship table between an MCS and a time domain density is shown in Table 12.

TABLE 12

A time domain density corresponding to a reserved MCS in an MCS table of 64 QAM

| MCS index | Time domain density |
| --- | --- |
| 29 | No PTRS |
| 30 | ¼ |
| 31 | ½ |

Alternatively, as shown in Table 13:

TABLE 13

| MCS index | Time domain density |
| --- | --- |
| 29 | ¼ |
| 30 | ½ |
| 31 | 1 |

Alternatively, as shown in Table 14:

TABLE 14

| MCS index | Time domain density |
| --- | --- |
| 29 | ½ |
| 30 | 1 |
| 31 | 1 |

For example, the pre-stored or predefined mapping relationship table between an MCS and a time domain density is shown in Table 15.

TABLE 15

A time domain density corresponding to a reserved MCS in an MCS table of 256 QAM

| MCS index | Time domain density |
| --- | --- |
| 28 | No PTRS |
| 29 | ¼ |
| 30 | ½ |
| 31 | 1 |

Alternatively, as shown in Table 16:

TABLE 16

| MCS index | Time domain density |
| --- | --- |
| 28 | ½ |
| 29 | 1 |
| 30 | 1 |
| 31 | 1 |

Alternatively, as shown in Table 17:

TABLE 17

| MCS index | Time domain density |
| --- | --- |
| 28 | ¼ |
| 29 | ¼ |
| 30 | 1 |
| 31 | 1 |

For example, the pre-stored or predefined mapping relationship table between a time domain density and a modulation order or a modulation mode corresponding to a code rate of reserved is shown in Table 18:

TABLE 18

A correspondence between a time domain density and a modulation order or a modulation mode corresponding to a code rate of reserved

| Modulation order or modulation mode | Time domain density |
|---|---|
| 2 or QPSK | No PTRS |
| 4 or 16 QAM | 1/4 |
| 6 or 64 QAM | 1/2 |
| 8 or 256 QAM | 1 |

Alternatively, as shown in Table 19:

TABLE 19

| Modulation order or modulation mode | Time domain density |
|---|---|
| 2 or QPSK | 1/2 |
| 4 or 16 QAM | 1 |
| 6 or 64 QAM | 1 |
| 8 or 256 QAM | 1 |

Alternatively, as shown in Table 20:

TABLE 20

| Modulation order or modulation mode | Time domain density |
|---|---|
| 2 or QPSK | 1/4 |
| 4 or 16 QAM | 1/2 |
| 6 or 64 QAM | 1 |
| 8 or 256 QAM | 1 |

It should be understood that values of the time domain density in Table 12 to Table 20 are merely examples, and are not limited in the present invention.

For example, Table 12 is used as an example. When an index of the MCS is 29, it is determined that the time domain density of the PTRS is 0, and a PTRS symbol is not mapped in time domain; when an index of the MCS is 30, it is determined that the time domain density of the PTRS is 1/4, in other words, one PTRS is mapped to every four OFDM symbols; or when an index of the MCS is 31, it is determined that the time domain density of the PTRS is 1/2, in other words, one PTRS is mapped to every two OFDM symbols.

For another example, Table 18 is used as an example. In this case, an MCS is not used as a reference, but a modulation order or a modulation mode is used as a reference. When a modulation order corresponding to a code rate of reserved is 2, the time domain density is 0, in other words, a PTRS symbol is not mapped; when a modulation order corresponding to a code rate of reserved is 4, the time domain density is 1/4, in other words, one PTRS symbol is mapped to every four OFDM symbols; when a modulation order corresponding to a code rate of reserved is 6, the time domain density is 1/2, in other words, one PTRS symbol is mapped to every two OFDM symbols; or when a modulation order corresponding to a code rate of reserved is 8, the time domain density is 1, in other words, one PTRS symbol is mapped to each OFDM symbol.

Optionally, the foregoing mapping relationship may be configured by the network device to the terminal device by using RRC signaling or MAC-CE.

Figure 2D:
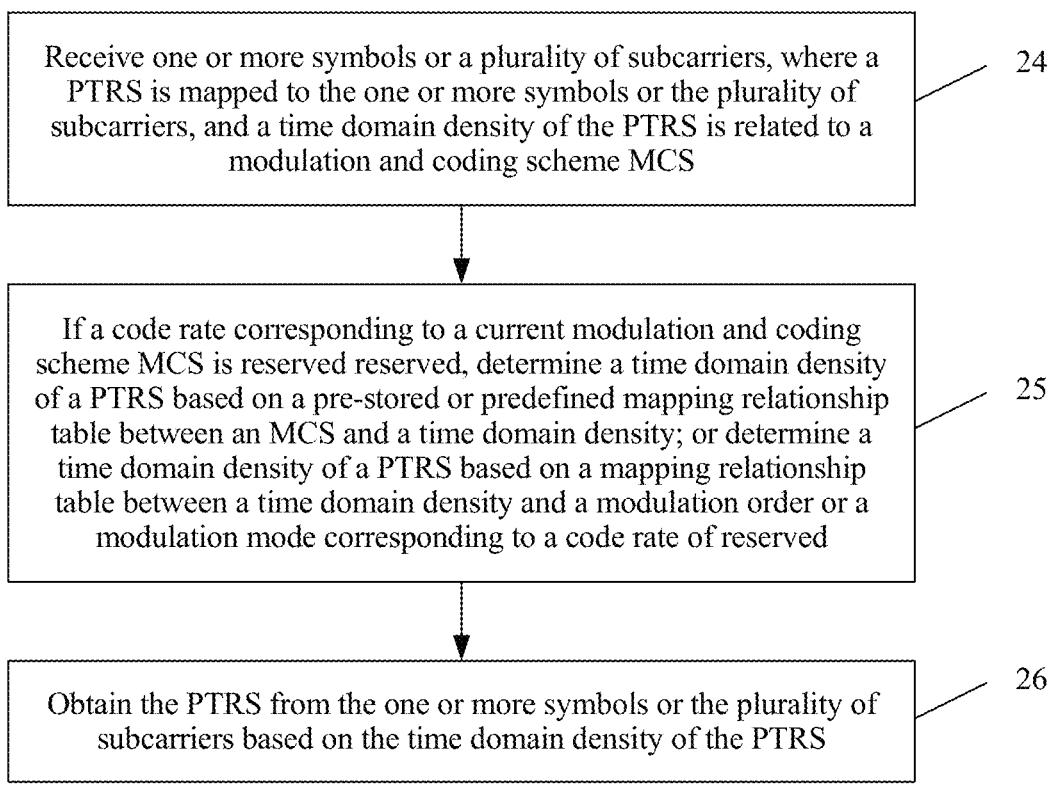
FIG. 2D is a schematic flowchart of still another wireless communication method according to an embodiment of this application.

An embodiment of the present invention further provides a wireless communication method, and the wireless communication method may be applied to a terminal device or a network device. As shown in FIG. 2D, the wireless communication method includes the following parts 24 to 26.

24. Receive one or more symbols or a plurality of subcarriers, where a PTRS is mapped to the one or more symbols or the plurality of subcarriers, and a time domain density of the PTRS is related to a modulation and coding scheme MCS.

25. If a code rate corresponding to a current modulation and coding scheme MCS is reserved reserved, determine a time domain density of the PTRS based on a pre-stored or predefined mapping relationship table between an MCS and a time domain density; or determine a time domain density of the PTRS based on a mapping relationship table between a time domain density and a modulation order or a modulation mode corresponding to a code rate of reserved.

26. Obtain the PTRS from the one or more symbols or the plurality of subcarriers based on the time domain density of the PTRS.

Optionally, when the method is performed by the terminal device, the method further includes:

receiving downlink signaling from the network device, where the downlink signaling includes information used to indicate the current MCS.

For example, the downlink signaling is DCI, and the current MCS occupies 5 or 6 bits.

Optionally, the target MCS is determined in a plurality of manners, for example, in any one of the foregoing first to fifth implementations described above, and details are not described herein again.

In this embodiment of the present invention, the apparatus may be divided into functional units based on the foregoing method examples. For example, each function unit may be obtained through division based on a corresponding function, or two or more functions may be integrated into one unit. The integrated unit may be implemented in a form of hardware, or may be implemented in a form of a software functional unit. It should be noted that, in this embodiment of the present invention, unit division is an example, and is merely a logical function division. In actual implementation, another division manner may be used.

Figure 4:
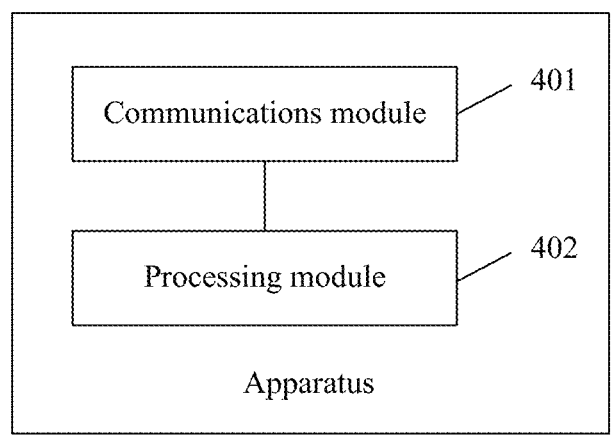
FIG. 4 is a schematic structural diagram of an apparatus according to an embodiment of this application.

FIG. 4 is a schematic structural diagram of an apparatus according to an embodiment of the present invention. The apparatus may be the apparatus in the foregoing method embodiment. The apparatus includes a communications module 401 and a processing module 402.

The processing module 402 is configured to: determine a target modulation and coding scheme MCS if a current MCS exceeds a predetermined threshold, where the target MCS is an MCS less than or equal to the predetermined threshold.

The processing module 402 is further configured to map a phase tracking reference signal PTRS to one or more symbols or subcarriers based on the target MCS.

Optionally, a manner in which the processing module 402 determines the target MCS is specifically: determining a target modulation order based on the current MCS; and determining an MCS corresponding to the target modulation order as the target MCS based on information about a correspondence between a modulation order and an MCS.

Optionally, a manner in which the processing module 402 determines the MCS corresponding to the target modulation order as the target MCS based on the information about the correspondence between a modulation order and an MCS is specifically: when the target modulation order corresponds to a plurality of MCSs, determining a largest MCS in the plurality of MCSs corresponding to the target modulation order as the target MCS.

Optionally, a manner in which the processing module 402 determines the MCS corresponding to the target modulation order as the target MCS based on the information about the correspondence between a modulation order and an MCS is specifically: when the target modulation order corresponds to a plurality of MCSs, determining a smallest MCS in the plurality of MCSs corresponding to the target modulation order as the target MCS.

Optionally, a manner in which the processing module 402 determines the target MCS is specifically: using, as the target MCS, an MCS used in initial transmission, an MCS used in last transmission, or an MCS used when data is initially transmitted.

Optionally, a manner in which the processing module 402 determines the target MCS is specifically: using the predetermined threshold as the target MCS.

Optionally, a manner in which the processing module 402 determines the target MCS is specifically: determining the target MCS based on a quantity of bits that currently need to be transmitted and scheduling bandwidth.

Optionally, a manner in which the processing module 402 determines the target MCS is specifically: determining an MCS that is configured by using a physical downlink control channel and that is less than or equal to the predetermined threshold as the target MCS.

Based on a same inventive concept, a problem-resolving principle of the session processing device provided in this embodiment of the present invention is similar to that of the session processing method provided in the method embodiments of the present invention. Therefore, for implementation of the session processing device, refer to the implementation of the methods. For brevity of description, details are not described herein again.

In another embodiment, the processing module 402 is configured to: if a code rate corresponding to a current modulation and coding scheme MCS is reserved reserved, determine a time domain density of the PTRS based on a pre-stored or predefined mapping relationship table between an MCS and a time domain density; or determine a time domain density of the PTRS based on a mapping relationship table between a time domain density and a modulation order or a modulation mode corresponding to a code rate of reserved.

The processing module 402 is further configured to map a phase tracking reference signal PTRS to one or more symbols based on the determined time domain density.

Based on a same inventive concept, a problem-resolving principle of the session processing device provided in this embodiment of the present invention is similar to that of the session processing method provided in the method embodiments of the present invention. Therefore, for implementation of the session processing device, refer to the implementation of the methods. For brevity of description, details are not described herein again.

Figure 5:
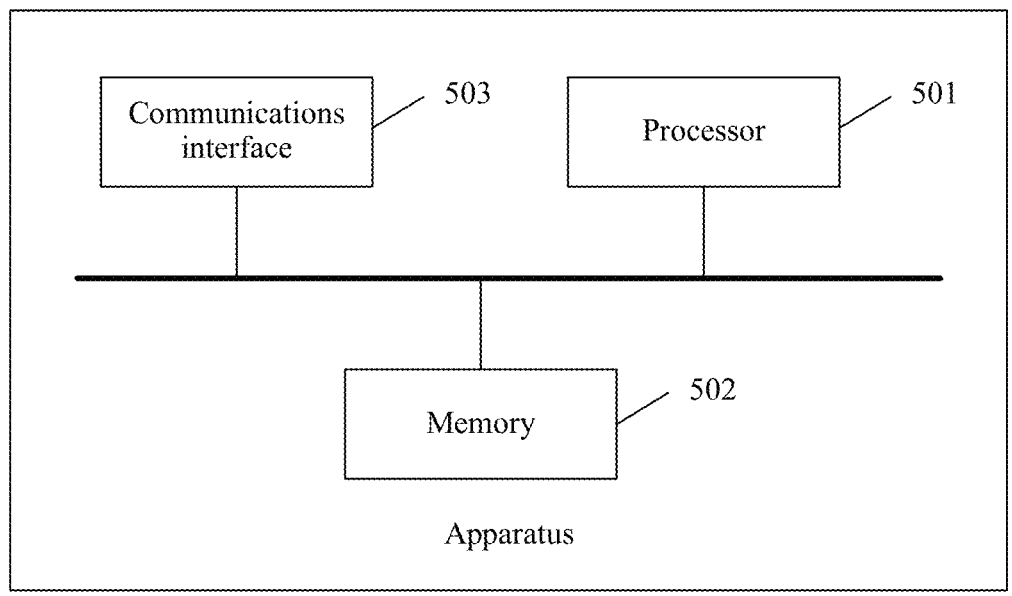
FIG. 5 is a schematic structural diagram of another apparatus according to an embodiment of this application.

FIG. 5 is a possible schematic structural diagram of an apparatus disclosed in an embodiment of this application. As shown in FIG. 5, the apparatus 500 includes a processor 501, a memory 502, and a communications interface 503. The processor 501, the memory 502, and the communications interface 503 are connected.

The processor 501 may be a central processing unit (CPU), a general-purpose processor, a coprocessor, a digital signal processor (DSP), an application-specific integrated circuit (ASIC), a field programmable gate array (FPGA), or another programmable logic device, a transistor logic device, a hardware component, or any combination thereof.

The communications interface 503 is configured to implement communication with another network element (for example, a terminal device).

The processor 501 invokes program code stored in the memory 502, to perform any one or more steps that may be performed by the network device in FIG. 2A to FIG. 2D in the foregoing method embodiments.

Figure 6:
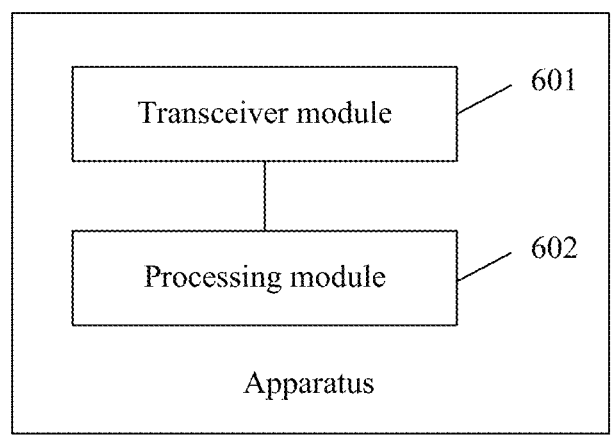
FIG. 6 is a schematic structural diagram of another apparatus according to an embodiment of this application.

FIG. 6 is a schematic structural diagram of an apparatus according to an embodiment of the present invention. The apparatus may be the apparatus in the foregoing method embodiment. The apparatus includes a transceiver module 601 and a processing module 602.

The transceiver module 601 is configured to receive one or more orthogonal frequency division multiplexing OFDM symbols, where the one or more OFDM symbols include a phase tracking reference signal PTRS.

The processing module 602 is configured to: determine a target modulation and coding scheme MCS if an MCS used for data included in the one or more OFDM symbols exceeds a predetermined threshold; and obtain the PTRS from the one or more OFDM symbols based on the target MCS.

It should be understood that the apparatus may be a network device or a terminal device, or may be a chip. When the apparatus is the network device or the terminal device, the transceiver module 601 may be a transceiver; or when the apparatus is the chip, the transceiver module 601 may be an input/output circuit of the chip.

Optionally, the transceiver module 601 is further configured to receive information used to indicate the MCS used for the data included in the one or more OFDM symbols.

Optionally, the apparatus further includes a storage module 603, configured to store information about a correspondence between an MCS and a modulation order.

The information about the correspondence between an MCS and a modulation order may be shown in Table 1 to Table 8 provided above, and details are not described herein again.

Optionally, the processing module 602 is specifically configured to: determine a target modulation order based on the modulation and coding scheme MCS used for the data included in the one or more OFDM symbols; and determine an MCS corresponding to the target modulation order as the target MCS based on information about a correspondence between a modulation order and an MCS.

Further, the processing module 602 is further configured to: when the target modulation order corresponds to a plurality of MCSs, determine a largest MCS in the plurality of MCSs corresponding to the target modulation order as the target MCS; or when the target modulation order corresponds to a plurality of MCSs, determine a smallest MCS in the plurality of MCSs corresponding to the target modulation order as the target MCS.

Optionally, the processing module 602 is specifically configured to: use, as the target MCS, an MCS used in initial transmission or an MCS used in last transmission, or use, as the target MCS, an MCS used in initial transmission.

Optionally, the processing module 602 is specifically configured to: obtain a time domain density of the PTRS based on the target MCS and information about a correspondence between an MCS and a time domain density of a PTRS; and obtain the PTRS based on the time domain density of the PTRS.

Optionally, the processing module 602 is specifically configured to use the predetermined threshold as the target MCS.

Optionally, the processing module 602 is specifically configured to determine the target MCS based on a quantity of bits that currently need to be transmitted and scheduling bandwidth.

Optionally, the processing module 602 is specifically configured to determine an MCS that is configured by using a physical downlink control channel and that is less than or equal to the predetermined threshold as the target MCS.

Based on a same inventive concept, a problem-resolving principle of the session processing device provided in this embodiment of the present invention is similar to that of the session processing method provided in the method embodiments of the present invention. Therefore, for implementation of the session processing device, refer to the implementation of the methods. For brevity of description, details are not described herein again.

In another embodiment, the transceiver module 601 is configured to receive one or more symbols or a plurality of subcarriers, where a PTRS is mapped to the one or more symbols or the plurality of subcarriers, and a time domain density of the PTRS is related to a modulation and coding scheme MCS.

The processing module 602 is configured to: if a code rate corresponding to a current modulation and coding scheme MCS is reserved reserved, determine the time domain density of the PTRS based on a pre-stored or predefined mapping relationship table between an MCS and a time domain density; or determine the time domain density of the PTRS based on a mapping relationship table between a time domain density and a modulation order or a modulation mode corresponding to a code rate of reserved; and obtain the PTRS from the one or more symbols or the plurality of subcarriers based on the time domain density of the PTRS.

Based on a same inventive concept, a problem-resolving principle of the session processing device provided in this embodiment of the present invention is similar to that of the session processing method provided in the method embodiments of the present invention. Therefore, for implementation of the session processing device, refer to the implementation of the methods. For brevity of description, details are not described herein again.

Figure 7:
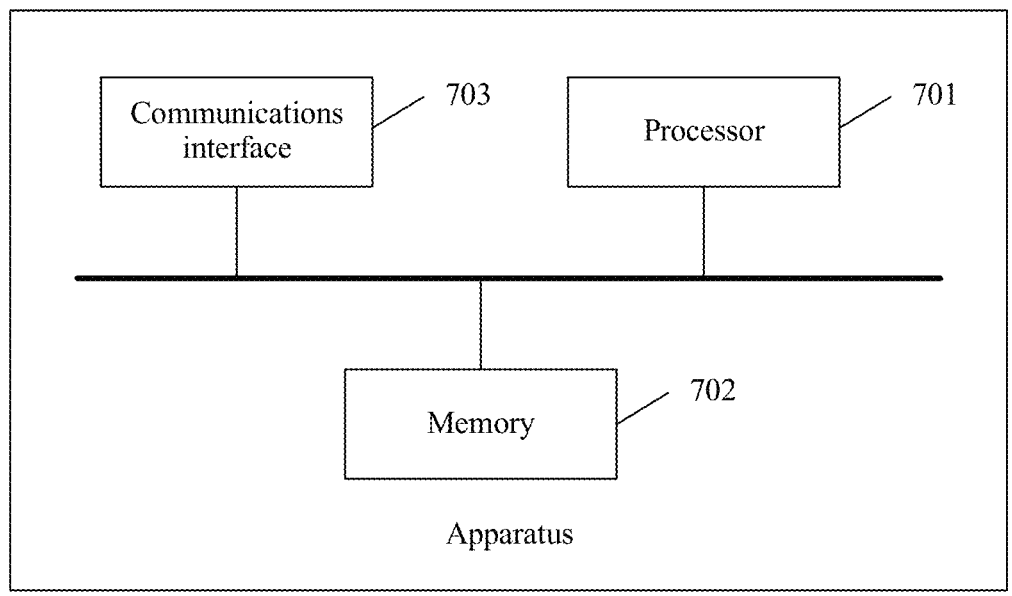
FIG. 7 is a schematic structural diagram of another apparatus according to an embodiment of this application.

FIG. 7 is a possible schematic structural diagram of an apparatus disclosed in an embodiment of this application. As shown in FIG. 7, the apparatus 700 includes a processor 701, a memory 702, and a communications interface 703. The processor 701, the memory 702, and the communications interface 703 are connected.

The processor 701 may be a central processing unit (CPU), a general-purpose processor, a coprocessor, a digital signal processor (DSP), an application-specific integrated circuit (ASIC), a field programmable gate array (FPGA), or another programmable logic device, a transistor logic device, a hardware component, or any combination thereof.

The communications interface 703 is configured to implement communication with another network element (for example, a terminal device).

The processor 701 invokes program code stored in the memory 702, to perform any one or more steps that may be performed by the terminal device in FIG. 2A to FIG. 2D in the foregoing method embodiments.

Based on a same inventive concept, a problem-resolving principle of the apparatus provided in this embodiment of this application is similar to that of the method embodiments of this application. Therefore, for implementation of the apparatus, refer to the implementation of the methods. For brevity of description, details are not described herein again.

In the foregoing embodiments, the descriptions of the embodiments have respective focuses. For a part that is not described in detail in an embodiment, refer to related descriptions in other embodiments.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center wiredly (for example, by using a coaxial cable, an optical fiber, or a digital subscriber line (DSL)) or wirelessly (for example, through infrared, radio, microwave, or the like). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Finally, it should be noted that the foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, and these modifications or replacements do not make essence of the corresponding technical solutions depart from the scope of the technical solutions of the embodiments of this application.

What is claimed is:

1. A wireless communication method, wherein the method comprises:

determining, by a communication device, a target modulation and coding scheme (MCS) index when a current MCS index exceeds a threshold, wherein the target MCS index is less than or equal to the threshold; and mapping, by the communication device, a phase tracking reference signal (PTRS) to one or more symbols or subcarriers based on the target MCS index;

wherein the threshold is 27 or 28.

2. The method according to claim 1, wherein the determining the target MCS index comprises:

determining, by the communication device, a target modulation order based on the current MCS index; and determining, by the communication device, an MCS index corresponding to the target modulation order as the target MCS index based on information about a correspondence between a modulation order and the MCS index.

3. The method according to claim 1, wherein the determining the target MCS comprises:

using, as the target MCS index, a first MCS index used in an initial transmission, or a second MCS index used in a last transmission.

4. The method according to claim 1, wherein when the threshold is 28, a value of the current MCS index is 29, 30 or 31.

5. The method according to claim 1, wherein when the threshold is 27, a value of the current MCS index is 28, 29, 30 or 31.

6. The method according to claim 1, wherein a value of a code rate corresponding to the current MCS index is reserved.

7. The method according to claim 1, wherein the mapping the PTRS to the one or more symbols or subcarriers based on the target MCS index comprises:
   determining a time domain density of the PTRS based on the target MCS index;
   determining a frequency domain density of the PTRS based on a scheduled bandwidth; and
   mapping the PTRS to one or more symbols or subcarriers based on the time domain density and the frequency domain density.

8. An apparatus, wherein the apparatus comprises:
   one or more memories configured to store instructions; and
   one or more processors coupled to the one or more memories and configured to execute the instructions to cause the apparatus to:
   determine a target modulation and coding scheme (MCS) index when a current MCS index exceeds a threshold, wherein the target MCS index is less than or equal to the threshold; and
   map a phase tracking reference signal (PTRS) to one or more symbols or subcarriers based on the target MCS index;
   wherein the threshold is 27 or 28.

9. The apparatus according to claim 8, wherein the one or more processors configured to execute the instructions further cause the apparatus to:
   determine a target modulation order based on the current MCS index; and
   determine an MCS index corresponding to the target modulation order as the target MCS index based on information about a correspondence between a modulation order and the MCS index.

10. The apparatus according to claim 8, wherein the one or more processors configured to execute the instructions further cause the apparatus to:
   use, as the target MCS index, a first MCS index used in an initial transmission, or a second MCS index used in a last transmission.

11. The apparatus according to claim 8, wherein when the threshold is 28, a value of the current MCS index is 29, 30 or 31.

12. The apparatus according to claim 8, wherein when the threshold is 27, a value of the current MCS index is 28, 29, 30 or 31.

13. The apparatus according to claim 8, wherein a value of a code rate corresponding to the current MCS index is reserved.

14. The apparatus according to claim 8, wherein the one or more processors configured to execute the instructions further cause the apparatus to:
   determine a time domain density of the PTRS based on the target MCS index;
   determine a frequency domain density of the PTRS based on a scheduled bandwidth; and
   map the PTRS to one or more symbols or subcarriers based on the time domain density and the frequency domain density.

15. A non-transitory computer readable medium, having stored thereon computer executable instructions that when executed by a processor of a computer, control the computer to perform steps comprising:
   determining a target modulation and coding scheme (MCS) index when a current MCS index exceeds a threshold, wherein the target MCS index is less than or equal to the threshold; and
   mapping a phase tracking reference signal (PTRS) to one or more symbols or subcarriers based on the target MCS index;
   wherein the threshold is 27 or 28.

16. The non-transitory computer readable medium according to claim 15, wherein the determining the target MCS comprises:
   using, as the target MCS index, a first MCS index used in an initial transmission, or a second MCS index used in a last transmission.

17. The non-transitory computer readable medium according to claim 15, wherein when the threshold is 28, a value of the current MCS index is 29, 30 or 31.

18. The non-transitory computer readable medium according to claim 15, wherein when the threshold is 27, a value of the current MCS index is 28, 29, 30 or 31.

19. The non-transitory computer readable medium according to claim 15, wherein a value of a code rate corresponding to the current MCS index is reserved.

20. The non-transitory computer readable medium according to claim 15, wherein the mapping the PTRS to the one or more symbols or subcarriers based on the target MCS index comprises:
   determining a time domain density of the PTRS based on the target MCS index;
   determining a frequency domain density of the PTRS based on a scheduled bandwidth; and
   mapping the PTRS to one or more symbols or subcarriers based on the time domain density and the frequency domain density.

* * * * *